United States Patent
Saito

(10) Patent No.: US 9,223,485 B2
(45) Date of Patent: Dec. 29, 2015

(54) IMAGE PROCESSING APPARATUS, IMAGE FORMING APPARATUS INCLUDING SAME, AND METHOD FOR CONTROLLING IMAGE PROCESSING APPARATUS

(71) Applicant: Kyocera Document Solutions Inc., Chuo-ku Osaka (JP)

(72) Inventor: Yasushi Saito, Osaka (JP)

(73) Assignee: KYOCERA DOCUMENTS SOLUTIONS INC., Osaka (JP)

(*) Notice: Subject to any disclaimer, the term of this patent is extended or adjusted under 35 U.S.C. 154(b) by 206 days.

(21) Appl. No.: 14/185,824

(22) Filed: Feb. 20, 2014

(65) Prior Publication Data

US 2014/0245216 A1   Aug. 28, 2014

(30) Foreign Application Priority Data

Feb. 27, 2013 (JP) ................... 2013-037530

(51) Int. Cl.
  *G06F 3/12* (2006.01)
  *G06F 3/0484* (2013.01)
  *G06F 3/0488* (2013.01)

(52) U.S. Cl.
  CPC ........ *G06F 3/04842* (2013.01); *G06F 3/04883* (2013.01)

(58) Field of Classification Search
  CPC ......... G06F 3/12; G06F 3/01; G06F 3/04842; G06F 3/0488; G06F 3/0481
  See application file for complete search history.

(56) References Cited

U.S. PATENT DOCUMENTS

| | | | |
|---|---|---|---|
| 8,411,928 B2 * | 4/2013 | Sasazawa ............... | G01B 11/24 250/559.4 |
| 2007/0070473 A1 * | 3/2007 | Lu ...................... | H04N 1/00405 358/537 |
| 2007/0081179 A1 | 4/2007 | Nishida ....................... | 358/1.11 |
| 2011/0188072 A1 * | 8/2011 | Ikeda ................... | H04N 1/0044 358/1.15 |
| 2011/0202875 A1 | 8/2011 | Kimura ......................... | 715/810 |
| 2012/0062564 A1 | 3/2012 | Miyashita et al. ............ | 345/419 |
| 2012/0163712 A1 * | 6/2012 | Nakajima ............. | G06T 7/0081 382/165 |
| 2013/0316817 A1 * | 11/2013 | Tanzawa ............... | G06F 3/0488 463/31 |
| 2014/0068499 A1 * | 3/2014 | Yoo ....................... | G06F 3/0488 715/781 |

FOREIGN PATENT DOCUMENTS

| | | |
|---|---|---|
| JP | 2000-67158 A | 3/2000 |
| JP | 3187895 B2 | 5/2001 |
| JP | 2007-19888 A | 1/2007 |
| JP | 2007-102715 A | 4/2007 |
| JP | 2007-110679 A | 4/2007 |
| JP | 2012-84137 A | 4/2012 |
| WO | WO 2010/050547 A1 | 5/2010 |

* cited by examiner

Primary Examiner — Rashawn Tillery
(74) Attorney, Agent, or Firm — Stein IP, LLC

(57) ABSTRACT

An image processing apparatus includes a storage portion, an image processing portion, a display portion, a touch panel portion for detecting a touched position, and a processing portion. The storage portion stores image data. The image processing portion performs image processing on the image data. The display portion displays a preview image indicating image data content. The processing portion recognizes touched positions, recognizes a rectangular region having a diagonal connecting two touched positions, recognizes the specified region on the basis of sections overlapping with the rectangular region among a plurality of sections obtained by dividing the preview image, and controls the image processing portion to perform the process on data of a part of the image data corresponding to the specified region.

20 Claims, 15 Drawing Sheets

IMAGE PROCESSING APPARATUS, IMAGE FORMING APPARATUS INCLUDING SAME, AND METHOD FOR CONTROLLING IMAGE PROCESSING APPARATUS

CROSS-REFERENCE TO RELATED APPLICATIONS

This application is based on and claims the benefit of priority from the corresponding Japanese Patent Application No. 2013-037530 filed on Feb. 27, 2013, in the Japanese Patent Office. The entire contents of which are hereby incorporated by reference.

BACKGROUND OF THE INVENTION

The present disclosure relates to an image processing apparatus including a display portion for displaying an image and a touch panel portion, so as to perform image processing on a specified range, and to an image processing method. Further, the present disclosure relates to an image forming apparatus including the image processing apparatus.

There are cases where an image forming apparatus such as a multifunctional peripheral, a copier, a printer, or a facsimile machine is equipped with a display portion with a touch panel for receiving user's operation and input. Further, the image forming apparatus may be capable of accepting inputs for specifying a desired range in image data and for instructing to edit or process of the image data in the specified range. In other words, there are cases where the image forming apparatus has functions of editing images and using the edited contents.

There is known the following image forming apparatus capable of specifying a range in image data and using the image data in the specified range. Specifically, there is known the image forming apparatus including an image display unit for displaying image data on an operation panel, a pressed position detection unit using a touch panel, a coordinate point display unit for displaying coordinate points of vertexes and arbitrary coordinate points on the operation panel so that the coordinate points of the image data displayed on the operation panel can be grasped, a coordinate input unit for receiving a coordinate input in a region in the image data, an image region specifying unit for specifying a region to be edited in the image data by the coordinate input unit, an image editing unit for editing the image in which the region is specified, a sheet size determining unit for determining a sheet size suitable for a size of image data edited after specifying the region, a sheet magnification specifying unit for specifying a magnification of the determined sheet size, an image printing unit for printing the edited image, and an image storing unit for storing images. With this structure, improvement of efficiency, accuracy, and operability when specifying a region is aimed.

There is a case where an image can be edited by the image forming apparatus. Further, when editing the image, the image indicating content of the image data to be edited may be displayed on the display portion. Further, the region to be edited in the displayed image may be specified by input using the touch panel. Because the region to be edited in the image data can be specified while viewing the image displayed on the display portion, the user can specify a desired region to be edited while viewing the region.

Conventionally, when specifying the region to be edited, software keys for specifying coordinate values of specific points in the range and a display box for the specified coordinate values are displayed on the display portion so that the region can be specified.

On the other hand, in order to improve visibility and understandability for users, it is preferred to display the image to be edited (image indicating the image data content) to be as large as possible on the display portion (display panel).

The display portion (display panel) disposed in the image forming apparatus becomes more expensive as being large. Therefore, every product cannot be equipped with a large screen display portion, and there is a limitation of the screen size of the display portion. Therefore, an operation of specifying the region to be edited may be accepted by using the touch panel. Thus, it is not necessary to display the software keys and the display box for specifying coordinates, and hence the image to be edited (image indicating the image data content) can be displayed in as large size as possible.

There are various methods of specifying the region to be edited by using the touch panel. For instance, it is possible to adopt a method of touching the touch panel portion a plurality of times so as to specify the region as a polygonal region having vertexes of the touched positions. In addition, it is possible to accept an operation of tracing touch positions so as to enclose the region to be edited as the operation for specifying the region.

However, when touching the touch panel with a finger to specify the region, because the finger contacts with the touch panel as a surface, a position recognized as the touched point may be deviated from the position desired by the user (intended position). In particular, it is difficult to specify a desired region by touching the touch panel with a finger for a male adult having thick fingers or a person who cannot touch accurately due to an injury or the like.

Therefore, conventionally, it is usually necessary when specifying the region by touching the touch panel by a finger to perform a fine adjustment of the specified region (range) by finely shifting the touched position or to redo the operation of specifying the region in order to specify the region desired by the user. Therefore, there is a problem that when specifying the region by using the touch panel, the operation of specifying the region in accordance with the desired range is difficult and requires time.

In the known technique described above, software keys for specifying the region may be displayed. Therefore, the image indicating the image data content may be displayed in a substantially reduced manner. Therefore, the target itself for specifying the region may be small, and hence it is difficult to specify the region in accordance with the desired range by touching the touch panel.

SUMMARY OF THE INVENTION

The present disclosure is made in view of the above-mentioned problem of the conventional technique. An image processing apparatus according to a first aspect of the present disclosure includes a storage portion for storing image data, an image processing portion for performing image processing on image data, a display portion for displaying a preview image indicating content of the image data on the basis of the image data, a touch panel portion disposed with respect to the display portion so as to detect a touched position which is a position touched by a user, and a processing portion which recognizes the touched position on the basis of an output of the touch panel portion, recognizes a rectangular region having a diagonal connecting two touched positions, recognizes a specified region on the basis of a section overlapping with the rectangular region among a plurality of sections obtained by dividing the preview image displayed on the display portion, and controls the image processing portion to perform processing of data of a part of the image data corresponding to the specified region.

In addition, a method for controlling an image processing apparatus according to a second aspect of the present disclosure includes the steps of storing image data, performing image processing on image data, displaying a preview image indicating content of the image data on the basis of the image data, detecting a touched position which is a position touched by a user on a display portion for displaying the preview image, recognizing the touched position so as to recognize a rectangular region having a diagonal connecting two touched positions, recognizing a specified region on the basis of a section overlapping with the rectangular region among a plurality of sections obtained by dividing the displayed preview image, and performing processing of data of a part of the image data corresponding to the specified region.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Now, with reference to FIGS. 1 to 18, an embodiment is described. Hereinafter, a multifunctional peripheral 100 (corresponding to the image forming apparatus) including an image processing apparatus 10 is exemplified for description. However, elements such as a structure and a layout described in this embodiment do not limit the scope of the disclosure and are merely a description example.

(Outline of Image Forming Apparatus)

Figure 1:
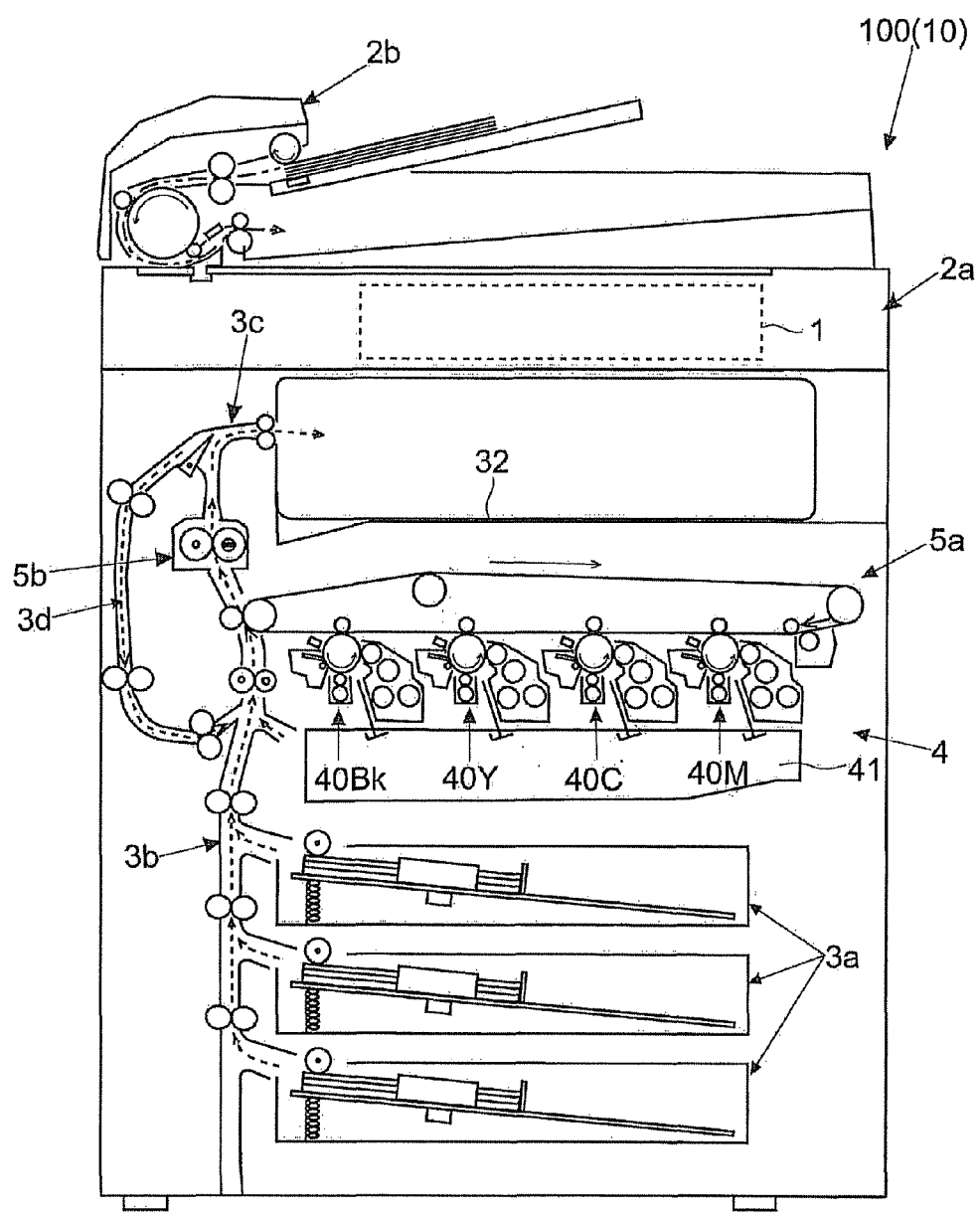
FIG. 1 is a diagram illustrating an example of a multifunctional peripheral according to an embodiment.

First, with reference to FIG. 1, outline of the multifunctional peripheral 100 according to the embodiment is described. FIG. 1 is a diagram illustrating an example of the multifunctional peripheral 100 according to the embodiment.

As illustrated in FIG. 1, on the front face of the multifunctional peripheral 100, there is disposed an operation panel 1 (details will be described later) for performing various settings of the multifunctional peripheral 100. In addition, as illustrated in FIG. 1, on the upper part of the multifunctional peripheral 100 of this embodiment, there are disposed an image reader 2a and a document feeder 2b. In addition, the multifunctional peripheral 100 includes a paper sheet feeder 3a, a transporting portion 3b, an image forming portion 4, an intermediate transfer portion 5a, a fixing portion 5b, a discharge transport portion 3c, and a double-side transporting portion 3d.

The image reader 2a reads a document so as to generate image data. The image reader 2a can read a plurality of sheets of documents fed to a reading position automatically and successively by the document feeder 2b.

Concerning printing, the paper sheet feeder 3a feeds paper sheets one by one to the transporting portion 3b. The transporting portion 3b transports the paper sheet toward a discharge tray 32. The image forming portion 4 forms a toner image on the basis of image data. The intermediate transfer portion 5a receives primary transferring of color toner images formed by image forming units 40 (a black image forming unit 40Bk, a yellow image forming unit 40Y, a cyan image forming unit 40C, and a magenta image forming unit 40M) for forming color toner images included in the image forming portion 4. Then, the intermediate transfer portion 5a performs secondary transferring onto the paper sheet. The fixing portion 5b fixes the toner image transferred onto the paper sheet. The paper sheet with fixed toner (printed paper sheet) is discharged to the discharge tray 32. The discharge transport portion 3c transports the paper sheet to the discharge tray 32 when discharging the printed paper sheet or to the double-side transporting portion 3d when performing double-sided printing. In this way, images are formed (printed) when a copy function or a print function is used.

The discharge transport portion 3c selects a paper sheet transport direction of the printed paper sheet to the discharge tray 32 or to the double-side transporting portion 3d. Then, the discharge transport portion 3c rotates in a forward direction so as to send out to the discharge tray 32 or guides the one-side printed paper sheet to the double-side transporting portion 3d when performing double sided printing. The double-side transporting portion 3d connects a downstream side of the fixing portion 5b and an upstream side of the image forming portion 4 so as to transport the one-side printed paper sheet.

(Operation Panel 1)

Figure 2:
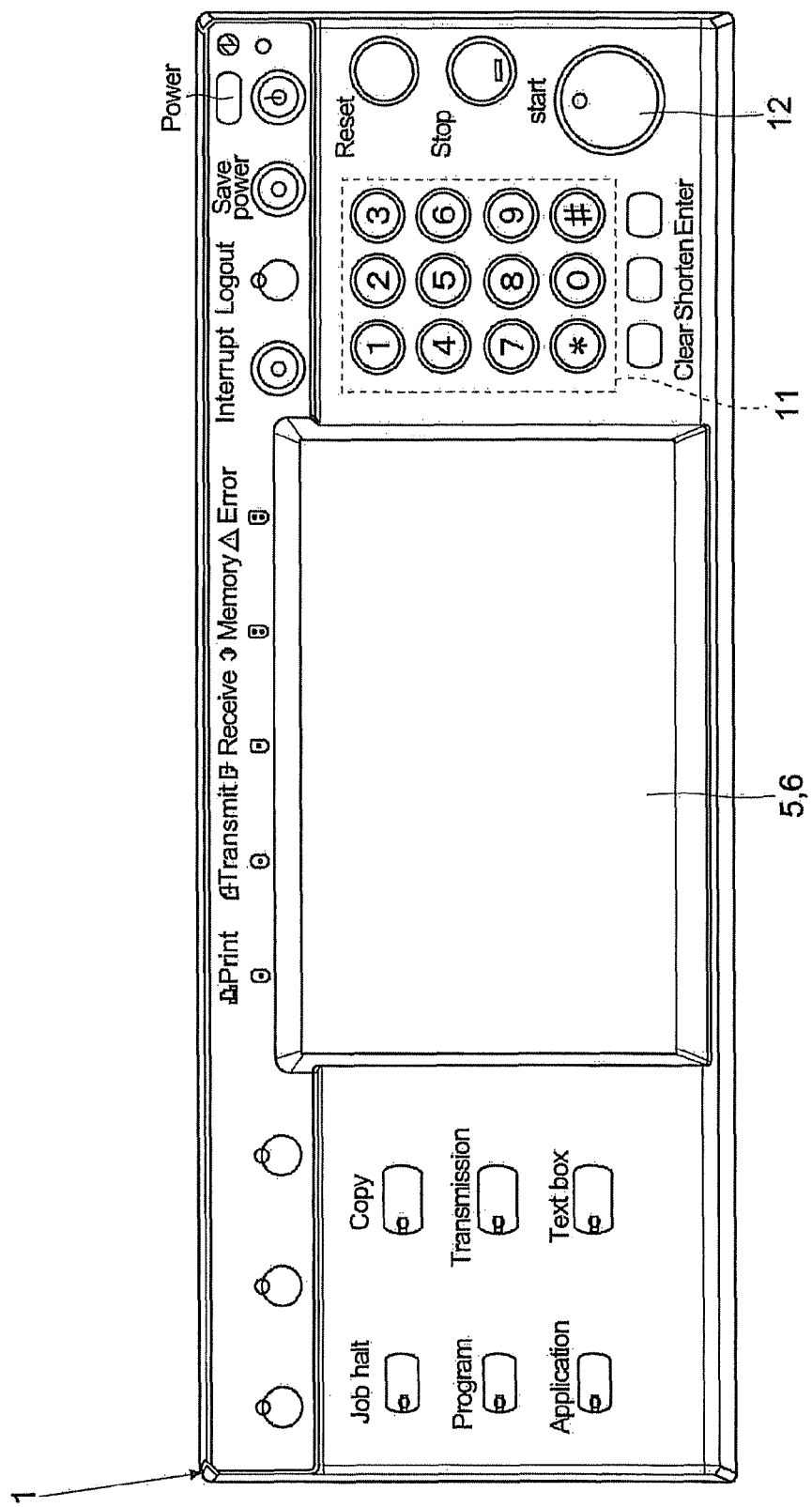
FIG. 2 is a diagram illustrating an example of an operation panel according to the embodiment.

Next, with reference to FIG. 2, the operation panel 1 according to the embodiment is described. FIG. 2 is a diagram illustrating an example of the operation panel 1 according to the embodiment.

As illustrated in FIG. 1, the operation panel 1 is disposed on an upper part of a front face of the multifunctional peripheral 100. Further, the operation panel 1 includes a display portion 5, a touch panel portion 6, and a plurality of hardware keys such as a ten-key portion 11 for numeric input and a start key 12 for instructing to start a copy or transmission job.

The display portion 5 is a liquid crystal display panel. The display portion 5 may be other type of display panel such as an organic EL panel. The display portion 5 displays a menu and keys for setting the multifunctional peripheral 100. In addition, the display portion 5 displays a preview image P of image data for a job to be performed (details will be described later). A user can input various settings of the multifunctional peripheral 100 by touching a display position of a key displayed on the display portion 5 or operating the touch panel portion 6.

In addition, the touch panel portion 6 is disposed on a top surface of the display portion 5 (so as to cover a top layer). The touch panel portion 6 detects a position or coordinates touched by the user. By comparing a display position of a key with the touched position, the key operated by the user is determined, and hence a user's input is accepted.

The touch panel portion 6 can recognize a plurality of simultaneously touched positions. For this purpose, a projected capacitive touch panel can be used for the touch panel portion 6. Note that the touch panel portion 6 is not limited to a capacitive type as long as it can recognize a plurality of touched positions.

(Hardware Structure of Multifunctional Peripheral 100 and the Like)

Figure 3:
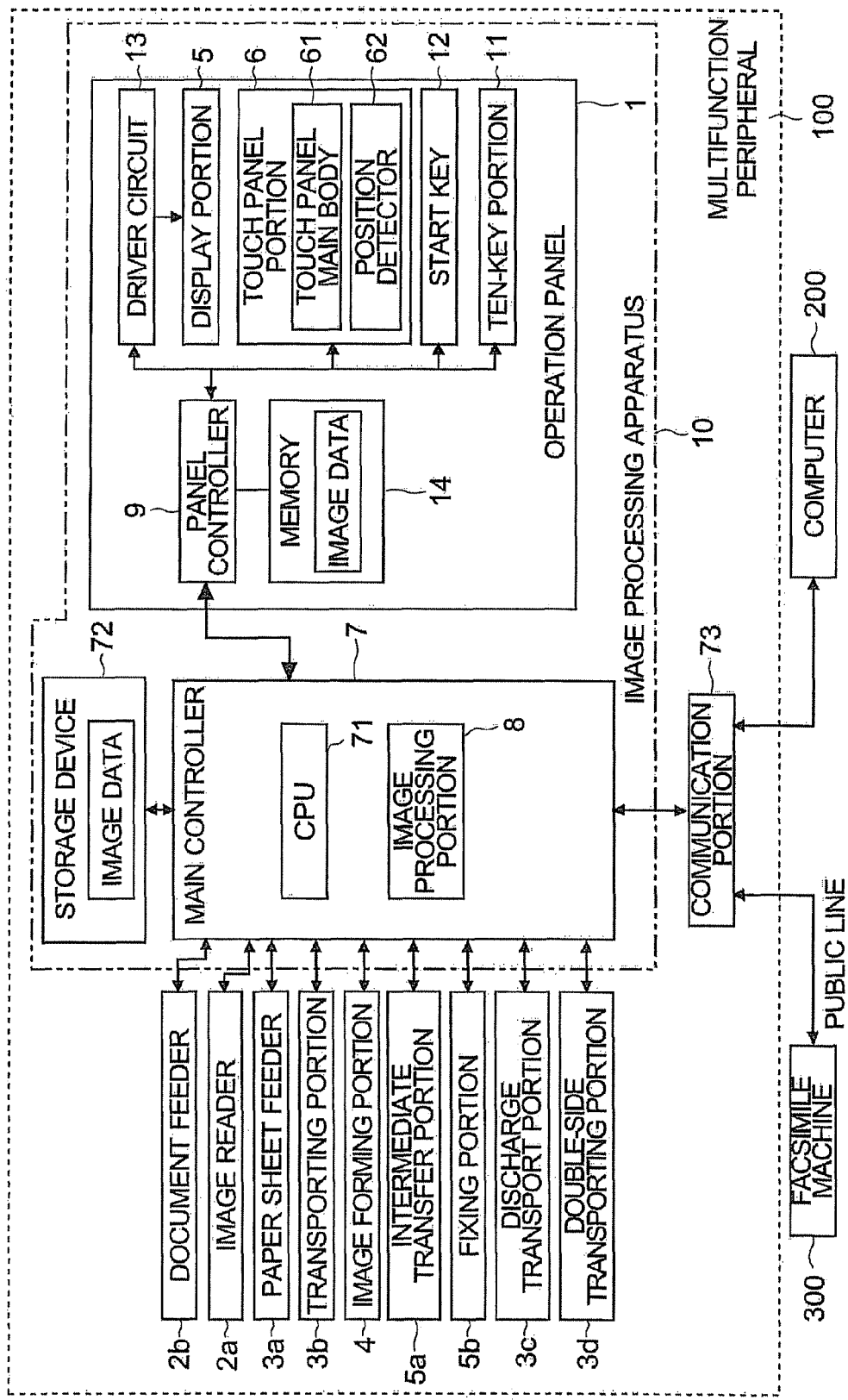
FIG. 3 is a diagram illustrating an example of a hardware structure of a multifunctional peripheral and the operation panel according to the embodiment.

Next, with reference to FIG. 3, an example of a hardware structure of the multifunctional peripheral 100 and the operation panel 1 according to the embodiment is described. FIG. 3 is a diagram illustrating a hardware structure of the multifunctional peripheral 100 and the operation panel 1.

First, a main controller 7 is disposed in a main body of the multifunctional peripheral 100. The main controller 7 is connected to the operation panel 1, the document feeder 2b, the image reader 2a, the paper sheet feeder 3a, the transporting portion 3b, the image forming portion 4, the intermediate transfer portion 5a, the fixing portion 5b, the discharge transport portion 3c, and the like, so as to control these portions.

The main controller 7 includes elements such as a CPU 71 and circuits for controlling. The CPU 71 performs calculation and controls the individual portions of the multifunctional peripheral 100 or the like on the basis of a loaded control program and data mounted in a storage device 72 (corresponding to the storage portion). The storage device 72 is connected to the main controller 7. The storage device 72 is a combination of nonvolatile and volatile storage devices such as ROM, a RAM, an HDD, and the like. The storage device 72 can store the control program for the multifunctional peripheral 100 and various data such as control data, setting data, and image data.

Figure 6:
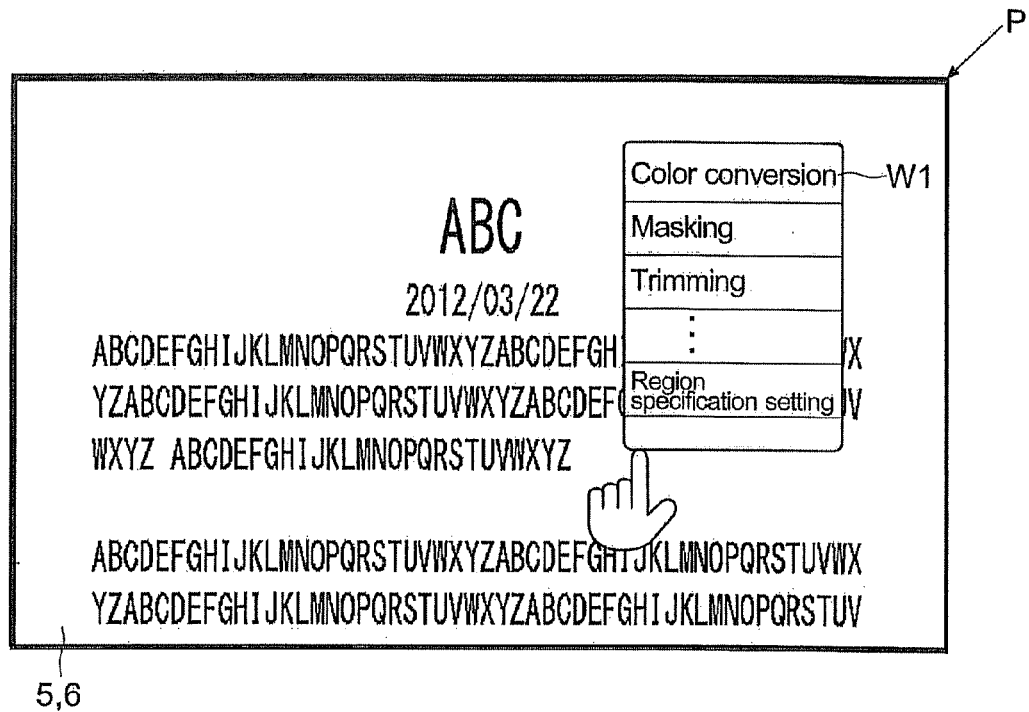
FIG. 6 is a diagram illustrating a selection example of the image editing function that is performed in a state where the preview image is displayed according to the embodiment.

Further, the main controller 7 is connected to a communication portion 73. The communication portion 73 is connected to a computer 200 or a facsimile machine 300 via a network or a public line (each one of them is illustrated in FIG. 6 for convenience sake). The main controller 7 can perform transmission to the external computer 200 or the facsimile machine 300 on the other side (a scanner function and a FAX transmission function). In addition, the main controller 7 can also perform printing on the basis of image data transmitted from the external computer 200 or the facsimile machine 300 on the other side, or image data input to the multifunctional peripheral 100 (the print function and a FAX reception function).

In addition, the main controller 7 is provided with an image processing portion 8 that performs image processing on image data obtained by reading a document by the image reader 2a, image data input to the multifunctional peripheral 100 via the communication portion 73, or image data stored in the storage device 72. The image data processed by the image processing portion 8 is transmitted to an exposing device 41 (see FIG. 1) so as to be used for scanning and exposing a photoreceptor drum included in each image forming unit 40, is stored in the storage device 72, or is transmitted externally via the communication portion 73.

In addition, the main controller 7 recognizes an input to the operation panel 1 and controls the multifunctional peripheral 100 to perform a job such as copying or scanning in accordance with user's setting.

The operation panel 1 of this embodiment includes a panel controller 9 (corresponding to the processing portion), the display portion 5, the touch panel portion 6, the hardware keys (for example, the ten-key portion 11 and the start key 12), a driver circuit 13, and a memory 14 (corresponding to the storage portion). The panel controller 9 is constituted of an element such as a CPU or an IC, and a circuit. The panel controller 9 controls display on the display portion 5, receives an output of the touch panel portion 6, and recognizes a touched position (coordinates). Data such as a table indicating correspondence between the output of the touch panel portion 6 and the position (coordinates) is stored in the memory 14. The panel controller 9 compares the touched position with image data of the displayed screen so as to recognize a key displayed at the touched position. Thus, the panel controller 9 recognizes the key specified by the user.

Data of screens and images displayed on the display portion 5 are stored in the memory 14 in the operation panel 1. Therefore, the panel controller 9 reads from the memory 14 data of a screen or an image to be displayed next in accordance with an operation performed by the touch panel portion 6. Note that the data of screens and images to be displayed on the display portion 5 may be stored in the storage device 72 of the main body. In this case, the panel controller 9 receives data of the image to be displayed on the display portion 5 from the storage device 72. The panel controller 9 instructs the driver circuit 13 (LCD driver IC in a case where the display portion 5 is the liquid crystal display panel), which actually control the display on the display portion 5, so as to control the display portion 5 to display on the basis of the data of the image to be displayed. Note that it is possible to configure that the operation panel 1 is not equipped with the panel controller 9 and the memory 14, and that the structure of the main controller 7 (the CPU 71 and the storage device 72) performs processing of the panel controller 9 and the memory 14.

In addition, the touch panel portion 6 is equipped with a touch panel main body 61 and a position detector 62 for detecting a touched position accompanying to the touch panel main body 61. For instance, the position detector 62 is an IC for detecting a touched position (coordinates). In a case where the touch panel portion 6 includes a projected capacitive panel, the position detector 62 detects a capacitance variation in the touch panel portion 6 so as to output a signal indicating one or more simultaneously touched positions. The panel controller 9 recognizes the touched positions on the basis of the output of the position detector 62.

Further, the multifunctional peripheral 100 of this embodiment includes the image processing apparatus 10 that performs image processing on the image data and displays the result. The image processing apparatus 10 in the multifunctional peripheral 100 includes the operation panel 1, the storage device 72, the main controller 7 (image processing portion 8), and the like. In other words, the operation panel 1, the storage device 72, the main controller 7 (image processing portion 8), and the like work as a part of the multifunctional peripheral 100 and also work as the image processing apparatus 10.

(Display of Preview Image P)

Figure 4:
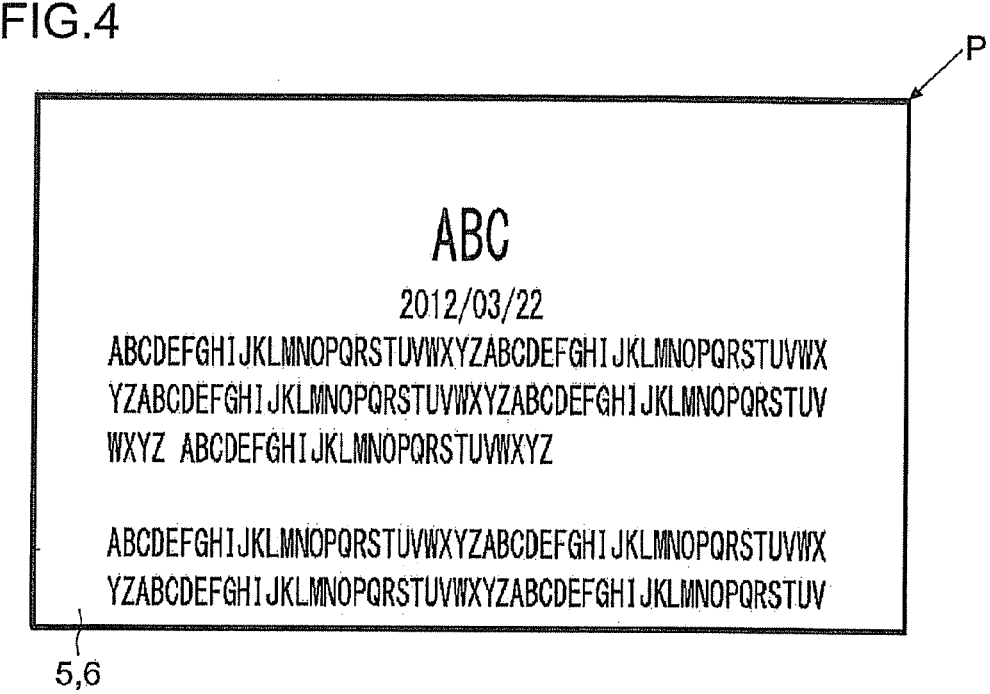
FIG. 4 is a diagram illustrating an example of a preview image according to the embodiment.

Next, with reference to FIGS. 3 and 4, the preview image P displayed in the image processing apparatus 10 (multifunctional peripheral 100) is described. FIG. 4 is a diagram illustrating an example of the preview image P according to the embodiment.

The display portion 5 of the operation panel 1 of this embodiment displays the preview image P indicating content of the image data to be used by the next job such as printing or transmission. FIG. 4 illustrates the preview image P of a text including alphabet character strings. Note that other following drawings also illustrate examples of texts including alphabet character strings.

The image data to be used by the job such as printing or transmission are stored in the storage device 72. When a document is read for performing the job such as copy or transmission, the image data generated by reading the document by the image reader 2a is temporarily stored in the storage device 72. Then, print (copy) or transmission of image data is performed on the basis of the image data generated by reading the document by the image reader 2a. When the copy or transmission job is performed, the panel controller 9 controls the display portion 5 to display the preview image P indicating the image data content to be used for performing the job for the user in front of the multifunctional peripheral 100.

In addition, the multifunctional peripheral 100 of this embodiment has a box function. In the box function, image data generated by reading a document or image data transmitted from the computer 200 can be stored in a nonvolatile storage region of the storage device 72. Then, in the box function, the stored image data can be used for performing later a printing job or a transmission job. Also in a case where the printing job or the transmission job is performed using the image data stored in a nonvolatile manner in the storage device 72, the main controller 7 controls the display portion 5 to display a preview image P indicating the image data content for performing the job.

Further, the image processing portion 8 generates the image data for displaying the preview image P (image data for displaying the preview image P on the display portion 5) on the basis of image data to be used for performing the job. For instance, the image processing portion 8 performs a process of reducing (thinning) the image data to be used for performing the job, so as to generate image data for displaying the preview image P. Then, the main controller 7 sends the image data for displaying the preview image P generated by the image processing portion 8 to the panel controller 9 of the operation panel 1 for the memory 14 to store. The panel controller 9 controls the display portion 5 (driver circuit) to display the preview image P on the basis of the image data for displaying the preview image P stored in the memory 14.

The multifunctional peripheral 100 (image processing apparatus 10) of this embodiment displays the preview image P on the entire display portion 5 as illustrated in FIG. 4. FIG. 4 illustrates an example in which the display portion 5 displays the preview image P in such a manner that a width of the display portion 5 agrees with a short side of the page (a width of the page). Further, keys for operation are not fixedly displayed. Operation on the preview image P is performed by a predetermined gesture operation to the touch panel portion 6.

For instance, the touch panel portion 6 accepts an operation of touching one point and moving the point (drag operation) as an operation for moving the display position in a page. When the drag operation is performed, the panel controller 9 scrolls the preview image P in accordance with amount and direction of moving the touched position.

(Image Editing Function)

Figure 5:
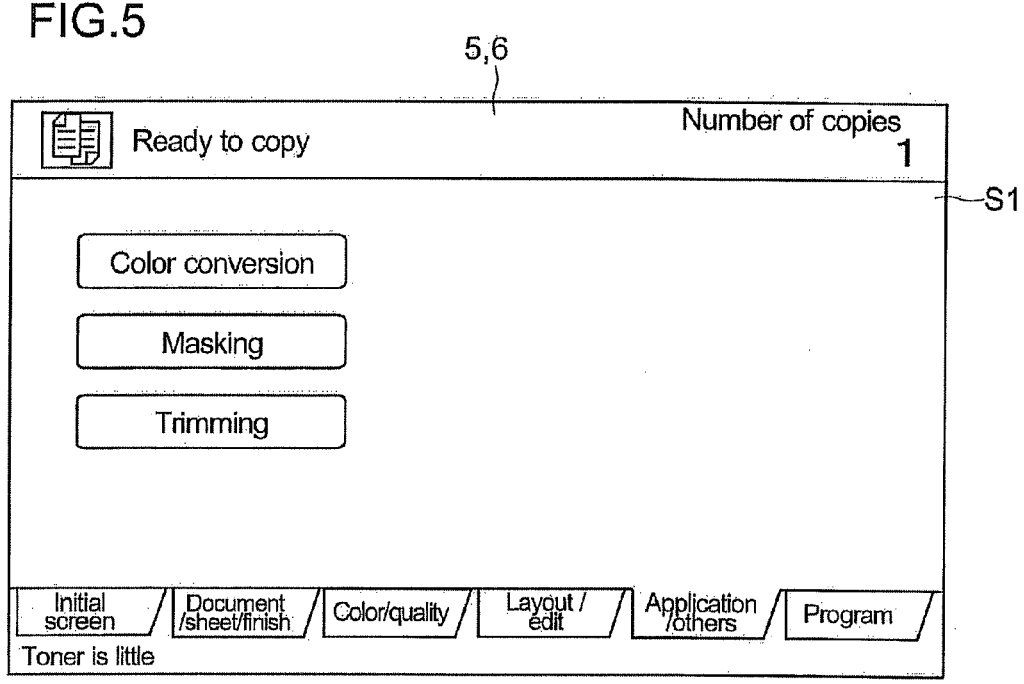
FIG. 5 is a diagram illustrating an example of a selection screen for an image editing function according to the embodiment.

Next, with reference to FIGS. 5 and 6, an image editing function of the multifunctional peripheral 100 (image processing apparatus 10) of this embodiment is described. FIG. 5 is a diagram illustrating an example of a selection screen S1 of the image editing function according to the embodiment. FIG. 6 is a diagram illustrating an example of a selection example of the image editing function in a state where the preview image P according to the embodiment is displayed.

In the multifunctional peripheral 100 (image processing apparatus 10) of this embodiment, it is possible to specify a region in which edition (process) is to be performed by the image processing with respect to the preview image P. In other words, image data of a range corresponding to a specified region F2 in the image data to be used for performing the job can be processed in edition.

As illustrated in FIGS. 5 and 6, a process such as color conversion, masking, or trimming can be performed on data of a part corresponding to the specified region F2 on the preview image P in the image data to be used for performing the job.

For instance, the color conversion process is a process of converting a color of data of a part corresponding to the specified region F2 on the preview image P in the image data to be used for performing the job. For instance, in the color conversion process, the image processing portion 8 performs a color conversion process of converting a color of a part of a character or a figure other than a background (having white color, for example) among pixels included in the data of the part corresponding to the specified region F2 into a desired color. Thus, it is possible to emphasize a character or a symbol in a specific region. Note that the image processing portion 8 may perform a color conversion process of converting colors of all pixels included in the data of the part corresponding to the specified region F2 in the image data to be used for performing the job.

In addition, the masking process is a process of filling the part corresponding to the specified region F2 on the preview image P in the image data to be used for performing the job, or a process of filling the region other than the corresponding part. For instance, the image processing portion 8 performs the masking process of filling color of all pixels in the data of the part corresponding to the specified region F2, or all pixels in the data of a part other than the data of the part corresponding to the specified region F2 in the image data to be used for performing the job with white, black, or a selected color.

In addition, the trimming process is a process of cropping (leaving) only the part corresponding to the specified region F2 on the preview image P in the image data to be used for performing the job. For instance, the image processing portion 8 performs the trimming process of leaving only the data of the part corresponding to the specified region F2 in the image data to be used for performing the job.

In the multifunctional peripheral 100 (image processing apparatus 10) of this embodiment, it is possible to select a process to be performed before displaying the preview image P, such as reading of document for copying or transmission, or retrieving image data from the storage device 72. In this case, when the user performs a predetermined operation to the operation panel 1 or the touch panel portion 6 before the preview image P is displayed, the panel controller 9 controls the display portion 5 to display the selection screen S1 for selecting the process to be performed as illustrated in FIG. 5. Then, the panel controller 9 recognizes that the process corresponding to the key displayed at the touched position is selected.

In addition, in the multifunctional peripheral 100 (image processing apparatus 10) of this embodiment, it is possible to select the process to be performed even while the preview image P is displayed. In this case, when the user performs a predetermined gesture operation (for example, long pressing of one point) for selecting the process to the touch panel portion 6 while the preview image P is displayed, the panel controller 9 controls the display portion 5 to display a selection window W1 for selecting the process to be performed as illustrated in FIG. 6. Then, the panel controller 9 recognizes a process of the touched position on the display among processes displayed as a menu in the displayed selection window W1 to be the selected process.

When the process is selected, the panel controller 9 controls to display a setting screen for setting content of the selected process (detailed description is omitted). For instance, the user can set in the setting screen a color to be converted, an object to be masked and a color used for the masking, magnification for printing a trimmed part on a paper sheet, and the like. The panel controller 9 controls the image processing portion 8 to perform the process on the image data to be used for performing the job on the basis of the setting made on the setting screen, and controls the image forming portion 4 or the communication portion 73 to perform the job such as printing or transmission.

In this way, the touch panel portion 6 accepts the input for selecting the process to be performed, and the process is the color conversion process, the masking process, the trimming process, or the like. For instance, it is possible to be capable of performing an edge enhancing process, a smoothing process, an affine transformation for changing a size or inclination of image, or the like as the process. Further, the processing portion (panel controller 9) controls the image processing portion 8 to perform the selected process on the data of the part corresponding to the specified region F2 in the image data. Thus, the user can select a desired region and perform a desired process on the image data.

(Division of Section in Region Specification)

Figure 7:
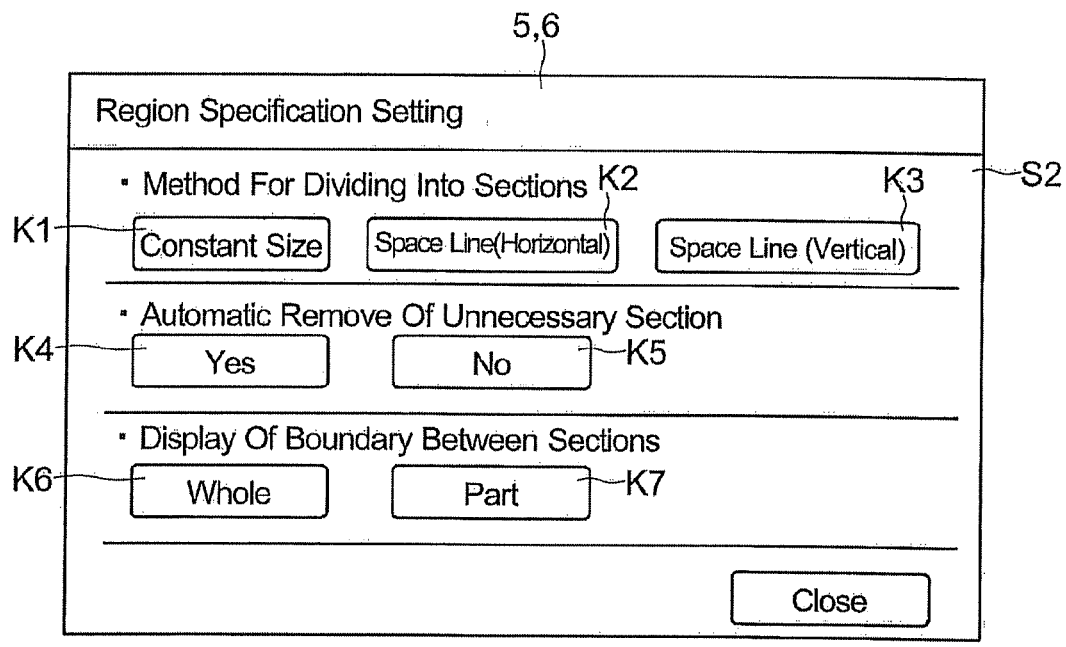
FIG. 7 is a diagram illustrating an example of a system setting screen concerning region specification.
Figure 8:
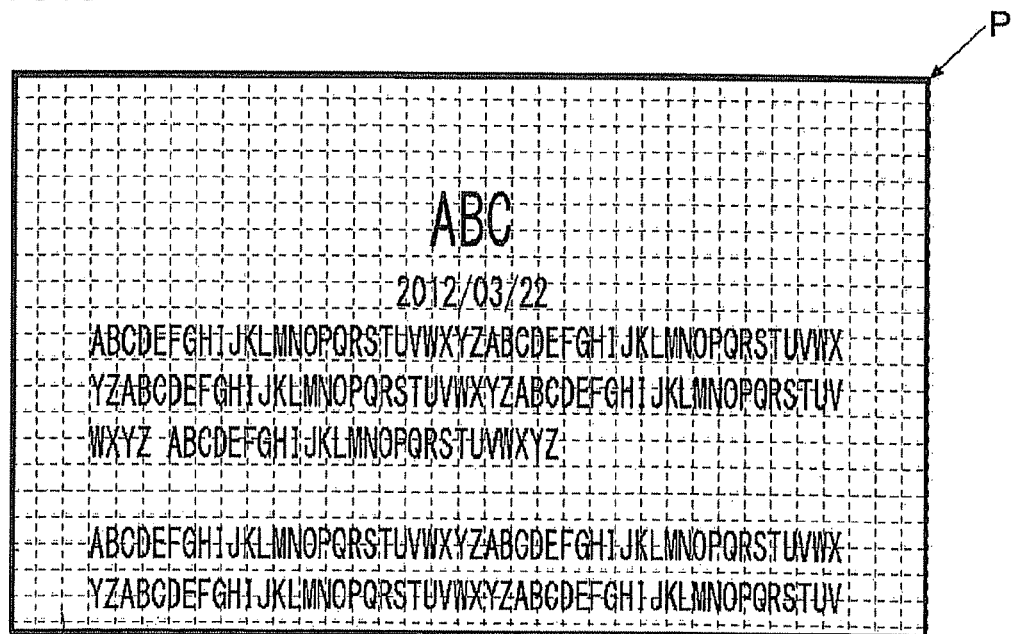
FIG. 8 is a diagram illustrating an example of division of the preview image into sections having a predetermined size in an image processing apparatus according to the embodiment.
Figure 9:
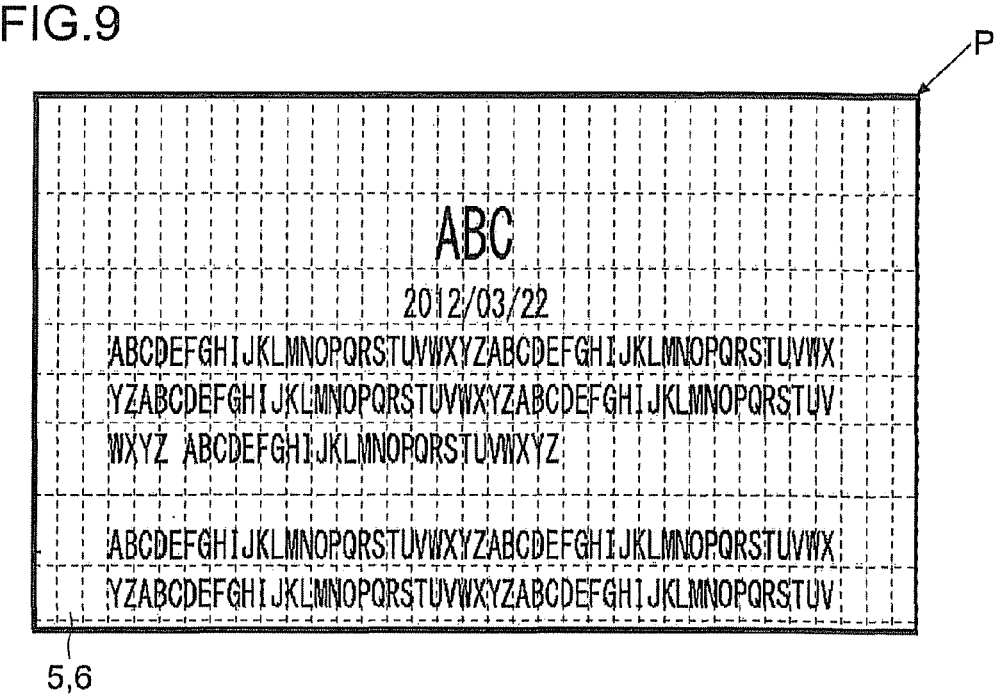
FIG. 9 is a diagram for explaining a case of dividing into sections on the basis of a space between lines in the image processing apparatus according to the embodiment.
Figure 10:
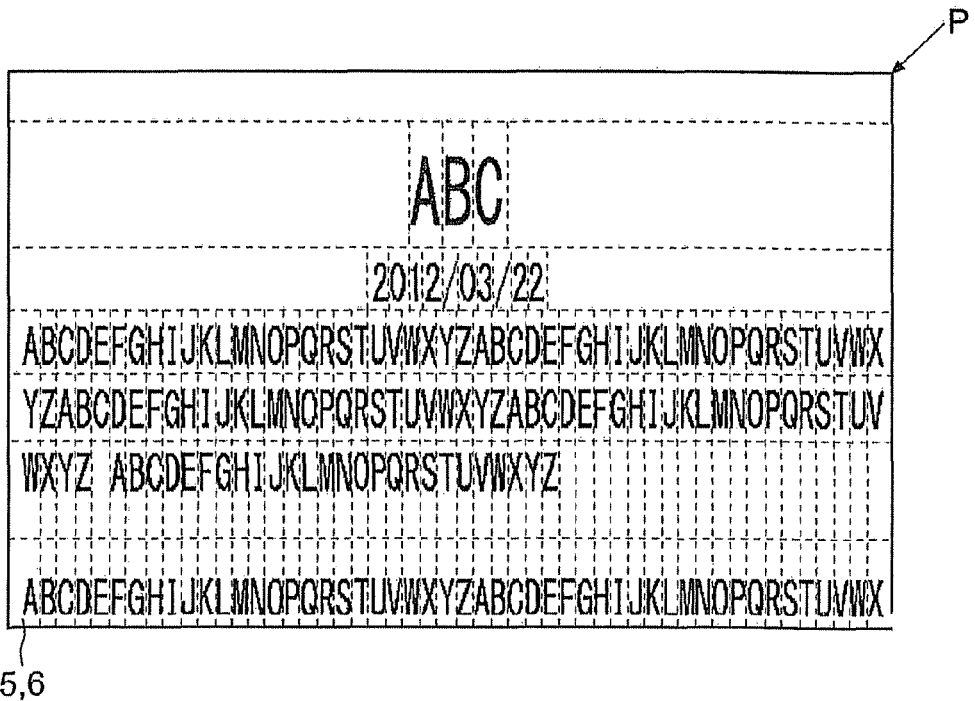
FIG. 10 is a diagram for explaining a case of dividing into sections on the basis of a space between lines and a space between characters in the image processing apparatus according to the embodiment.

Next, with reference to FIGS. 7 to 10, division into sections in the region specification in the image processing apparatus 10 of this embodiment is described. FIG. 7 is a diagram illustrating an example of a region specification setting screen S2 according to the embodiment. FIG. 8 is a diagram illustrating an example of division of the preview image P into sections having a predetermined size. FIG. 9 is a diagram illustrating an example of a case of dividing into sections on the basis of a space between lines. FIG. 10 is a diagram illustrating an example of a case of dividing into sections on the basis of the space between lines and a space between characters.

In the multifunctional peripheral 100 (image processing apparatus 10) of this embodiment, it is possible to divide the preview image P into a plurality of sections and to specify the region by a section. As described later, there are prepared a plurality of methods for the dividing into sections.

As illustrated in FIG. 7, it is possible to set in advance a method for dividing the preview image P into sections. The user can retrieve the region specification setting screen S2 concerning the region specification illustrated in FIG. 7 by operating the touch panel portion 6 or various hardware keys. In the region specification setting screen S2, there are disposed a constant size key K1 (with characters of "constant size" in FIG. 7), a first space line key K2 (with characters of "space line (horizontal)" in FIG. 7), and a second space line key K3 (with characters of "space line (vertical)" in FIG. 7). The user can set in advance a methods for dividing the preview image P into sections by touching a display position of the constant size key K1, the first space line key K2, or the second space line key K3. Note that as illustrated in FIG. 6, it is possible to adopt a structure in which a menu for retrieving the region specification setting screen S2 is included in the selection window W1, so that the region specification setting screen S2 can be retrieved for setting even in a state where the preview image P is displayed.

The constant size key K1 is touched when the preview image P (image data of the preview image P) is divided into sections having a predetermined constant size. When it is set by the region specification setting screen S2 to divide into sections having a constant size, the processing portion (panel controller 9) divides the preview image P displayed on the display portion 5 into a plurality of sections having a predetermined size in a lattice manner. Thus, it is possible to quickly divide into sections. Further, because it is divided into sections having a predetermined size not in a complicated shape but in a lattice manner, the user can easily expect which range is specified as the specified region F2 by two-point touching.

Specifically, FIG. 8 illustrates an example of dividing the preview image P into sections having a predetermined size. In the multifunctional peripheral 100 (image processing apparatus 10) of this embodiment, the section is a rectangle. A size of the predetermined rectangle is not limited particularly and may be approximately 1 to 3 mm vertically and 1 to 3 mm horizontally. Note that the vertical length and the horizontal length of the section may be larger than 3 mm. For instance, the section may be a square of 2 mm vertically and 2 mm horizontally, or may be a rectangle of 1 mm vertically and 2 mm horizontally, or 3 mm vertically and 2 mm horizontally.

Further, as illustrated in FIG. 8 and following drawings, the panel controller 9 controls the display portion 5 to display a boundary between sections to be overlaid on the preview image P. Note that FIG. 8 and following drawings illustrate an example in which the boundary between sections is indicated by a broken line (the boundary between sections may be indicated by another type of line than the broken line, or the boundary between sections may be indicated by a specific color).

The first space line key K2 is touched when dividing so that the boundary between sections is positioned in a space line (having a background color, for example, white color) that extends horizontally and has a predetermined width (a predetermined number of pixels in the vertical direction) or larger width. When the display position of the first space line key K2 is touched, a state where the first space line key K2 is selected (a state where the boundary between sections is disposed with reference to the space line extending horizontally) is appeared. When the display position of the first space line key K2 is touched again, a state where the first space line key K2 is not selected is appeared. Note that the panel controller 9 controls the display portion 5 to display the first space line key K2 in different colors in the state where it is selected and in the state where it is not selected, although not illustrated.

When the first space line key K2 is selected and it is set to divide into sections by the space line that extends horizontally and has a predetermined width (a predetermined number of pixels in the vertical direction) or larger width, the panel controller 9 recognizes the space line that extends horizontally and has a predetermined width (a predetermined number of pixels in the vertical direction) or larger width in the preview image P.

In order to perform the division into sections by this method, the panel controller 9 generates a histogram of density (color) distribution of pixels of the image data for displaying the preview image P. Then, the panel controller 9 recognizes that pixels in a constant density range including density (color) having a largest frequency to be pixels of the background color. For instance, the panel controller 9 recognizes pixels whose pixel value difference from a pixel value of a largest frequency is within a predetermined pixel value to be pixels of the background color. In FIG. 9 and following drawings, the background color is white color.

The panel controller 9 recognizes a space line that has a predetermined number or more pixels continued (arranged) having a pixel value within the constant density range and extends horizontally in the image data for displaying the preview image P. In addition, the panel controller 9 recognizes a bunch of space lines having a predetermined width (a predetermined number of pixels in the vertical direction) or larger width in the image data of the preview image P. Then, the panel controller 9 divides the preview image P so that the boundary between sections is positioned in the space line (in the bunch of space lines) having a predetermined width (a predetermined number of pixels in the vertical direction) or larger width.

As a result, as illustrated in FIG. 9, the boundaries between sections are disposed so as to divide the document into lines by spaces between lines. Therefore, a vertical width of the section varies in accordance with content of the preview image P.

In addition, the second space line key K3 is touched when dividing so that the boundary between sections is positioned in a space line (having a background color, for example, white color) that extends vertically and has a predetermined width (a predetermined number of pixels in the horizontal direction) or larger width. When the display position of the second space line key K3 is touched, a state where the second space line key K3 is selected (a state where the boundary between sections is disposed with reference to the space line in the vertical direction) is appeared. When the display position of the second space line key K3 is touched again, a state where the second space line key K3 is not selected is appeared. Note that the panel controller 9 controls the display portion 5 to display the second space line key K3 in different colors in the state where it is selected and in the state where it is not selected, although not illustrated.

When the second space line key K3 is selected and it is set to divide into sections by the space line that extends vertically and has a predetermined width (a predetermined number of pixels in the horizontal direction) or larger width, the panel controller 9 recognizes the space line that extends vertically and has a predetermined width (a predetermined number of pixels in the horizontal direction) or larger width in the preview image P.

Specifically, the panel controller 9 generates a histogram of density (color) distribution of pixels of the image data for displaying the preview image P. Then, the panel controller 9 recognizes that pixels in a constant density range including density (color) having a largest frequency to be pixels of the background color.

The panel controller 9 recognizes a space line that has a predetermined number or more continued (arranged) pixels having pixel values within a constant density range and extends vertically in the image data for displaying the preview image P. In addition, the panel controller 9 recognizes a bunch of space lines having a predetermined width (a predetermined number of pixels in the horizontal direction) or larger width in the image data of the preview image P. Then, the panel controller 9 divides the preview image P so that the boundary between sections is positioned in the space line (in the bunch of space lines) having a predetermined width (a predetermined number of pixels in the horizontal direction) or larger width.

As a result, as illustrated in FIG. 10, the boundary between sections is disposed so as to divide by the space between characters in the vertical direction. Therefore, a horizontal width of the section varies in accordance with content of the preview image P.

Note that in the multifunctional peripheral 100 (image processing apparatus 10) of this embodiment, it is possible to select only one of the first space line key K2 and the second space line key K3 or to select both of them. FIG. 9 illustrates an example where only the first space line key K2 is selected. In this case, the division into sections is performed so that the boundary is positioned in the space line that extends horizontally and has a predetermined width (a predetermined number of pixels in the vertical direction) or larger width. However, the horizontal width of the section is set to a predetermined value.

FIG. 10 illustrates an example where both the first space line key K2 and the second space line key K3 are selected. In this case, the division into sections is performed so that the boundary is positioned in the space line that extends horizontally and has a predetermined width (a predetermined number of pixels in the vertical direction) or larger width and in the space line that extends vertically and has a predetermined width (a predetermined number of pixels in the horizontal direction) or larger width. Therefore, the vertical width and the horizontal width of the section vary in accordance with content of the preview image P.

Note that when only the second space line key K3 is selected, the division into sections is performed so that the boundary is disposed in the bunch of space lines that extends vertically and has a predetermined width (a predetermined number of pixels in the horizontal direction) or larger width (not shown). However, the vertical width of the section is set to be a predetermined size.

In this way, the processing portion (panel controller 9) recognizes a space line having a predetermined width or larger width on the basis of a width of a background color part in the preview image P, and divides the preview image P into a plurality of sections so that the boundary between sections is disposed in at least one of the space line extending horizontally and the space line extending vertically. Thus, the processing portion recognizes the space between lines on the basis of the width of the background color of the background color in the preview image P, and can divides the preview image P into a plurality of sections so that the boundary between sections is positioned in the space between lines. Therefore, the region can be specified by a line. In addition, the processing portion recognizes the space between characters on the basis of the width of the background color in the preview image P and can divide the preview image P into a plurality of sections so that the boundary between sections is positioned in the space between characters. Therefore, the region can be easily specified by a character.

In addition, the touch panel portion 6 receives in advance the selection of dividing the preview image P displayed on the display portion 5 into a plurality of sections having a predetermined size in a lattice manner, or dividing the preview image P into a plurality of sections so that the boundary between sections is positioned in at least one of the space line extending horizontally and the space line extending vertically, and the processing portion (panel controller 9) divides the preview image P into a plurality of sections in accordance with the received selection.

(Region Specification)

Figure 11:
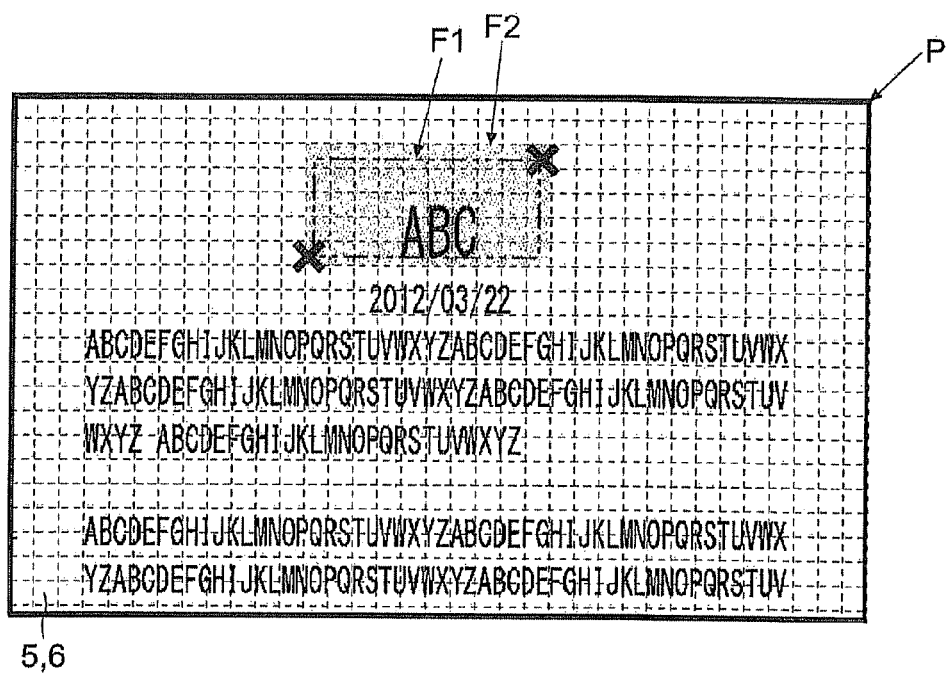
FIG. 11 is a diagram for explaining the region specification based on a rectangular region obtained by touching two points in the image processing apparatus according to the embodiment.

Next, with reference to FIG. 11, the region specification is described. FIG. 11 is a diagram for explaining the region specification based on a rectangular region F1 by two-point touching.

In the multifunctional peripheral 100 (image processing apparatus 10) of this embodiment, a region can be specified by two-point touching. A mark "x" in FIG. 11 indicates a touched position (the same is true in FIG. 11 and following drawings).

The panel controller 9 recognizes that there is performed the two-point touching (gesture operation of adding a touched position in a state where on position is touched) on the basis of an output of the touch panel portion 6. Then, the panel controller 9 recognizes a rectangular region F1 having a diagonal connecting two touched positions. If the right side point of the two touched points is positioned in the upper side (see FIG. 11), the panel controller 9 recognizes a right side touched position as the upper right corner of the rectangular region F1 and recognizes the left side touched position as the lower left corner of the rectangular region F1. Then, the panel controller 9 recognizes an intersection of a horizontal line extending from the recognized lower left corner and a vertical line extending from the upper right corner as the lower right corner of the rectangular region F1. In addition, the panel controller 9 recognizes an intersection of a vertical line extending from the recognized lower left corner and a horizontal line extending from the upper right corner as the upper left corner of the rectangular region F1.

In addition, if the left side point of the two touched points is positioned in the upper side, the panel controller 9 recognizes the right side touched position as the lower right corner of the rectangular region F1 and recognizes the left side touched position as the upper left corner of the rectangular region F1. Then, the panel controller 9 recognizes an intersection of a horizontal line extending from the recognized upper left corner and a vertical line extending from the lower right corner as the upper right corner of the rectangular region F1. In addition, the panel controller 9 recognizes an intersection of a vertical line extending from the recognized upper left corner and a horizontal line extending from the lower right corner as the lower left corner of the rectangular region F1.

FIG. 11 illustrates the preview image P that is divided into sections having a predetermined size. Further, the panel controller 9 recognizes the rectangular region F1 on the basis of the two simultaneously touched points. Then, as illustrated in FIG. 11, the panel controller 9 recognizes sections overlapping completely and partially with the rectangular region F1 when viewing the display portion 5 from above as the specified region F2. Then, the panel controller 9 controls the display portion 5 to display the boundary between sections that overlap with the rectangular region F1 and sections that do not overlap with the rectangular region as the boundary of the specified region F2. In the FIG. 11, the specified region F2 is illustrated by half-tone dot meshing.

In this way, in the multifunctional peripheral 100 (image processing apparatus 10) of this embodiment, it is possible to specify the region by a section. Then, the panel controller 9 controls the image processing portion 8 to perform the process on the data (pixels) of the part of the image data to be used for the job, corresponding to the specified region F2 in the preview image P.

(Automatic Adjustment of Boundary of Specified Region F2)

Figure 12:
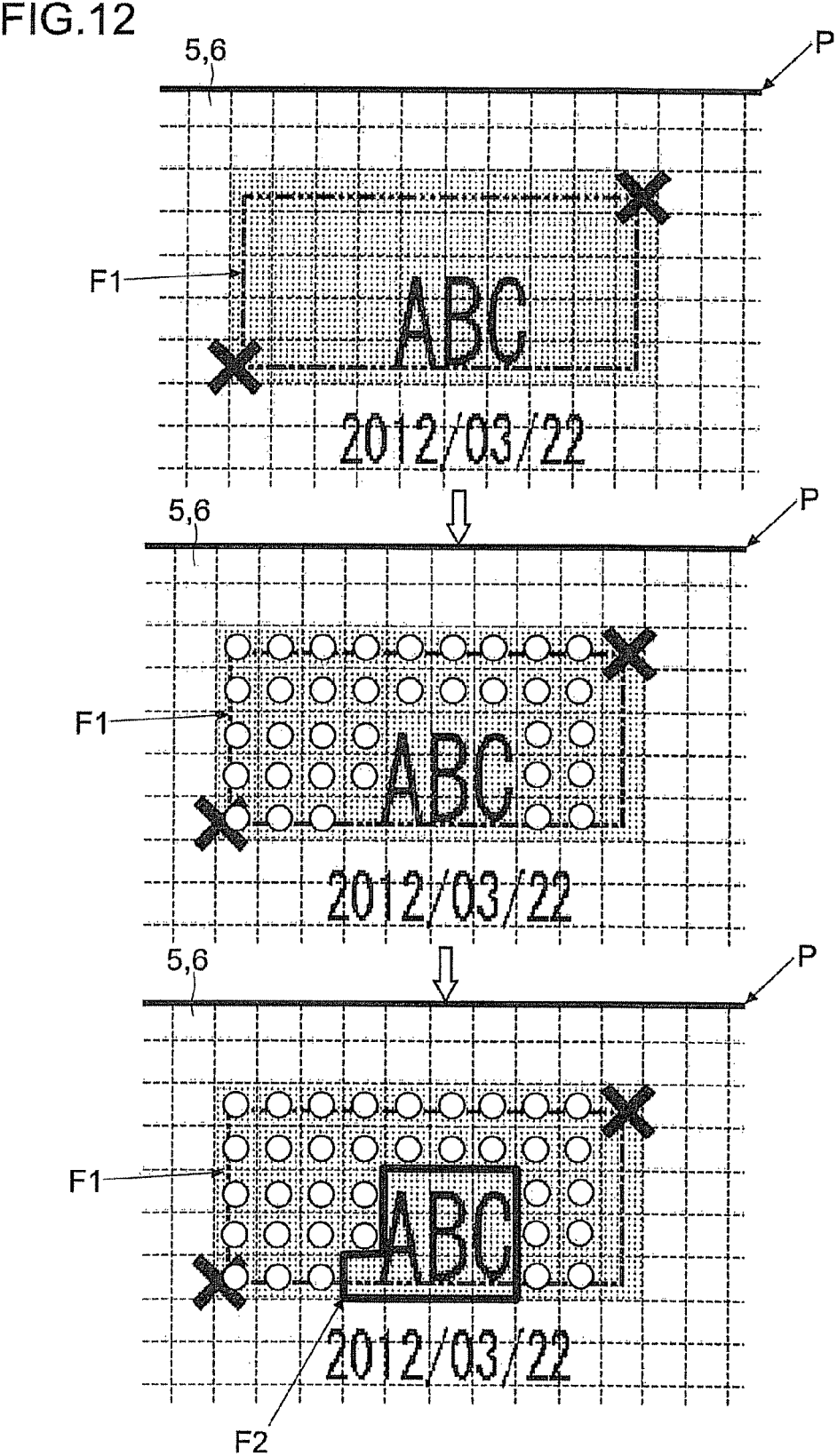
FIG. 12 is an explanatory diagram for explaining automatic adjustment of a boundary of a specified region in the image processing apparatus according to the embodiment.
Figure 13:
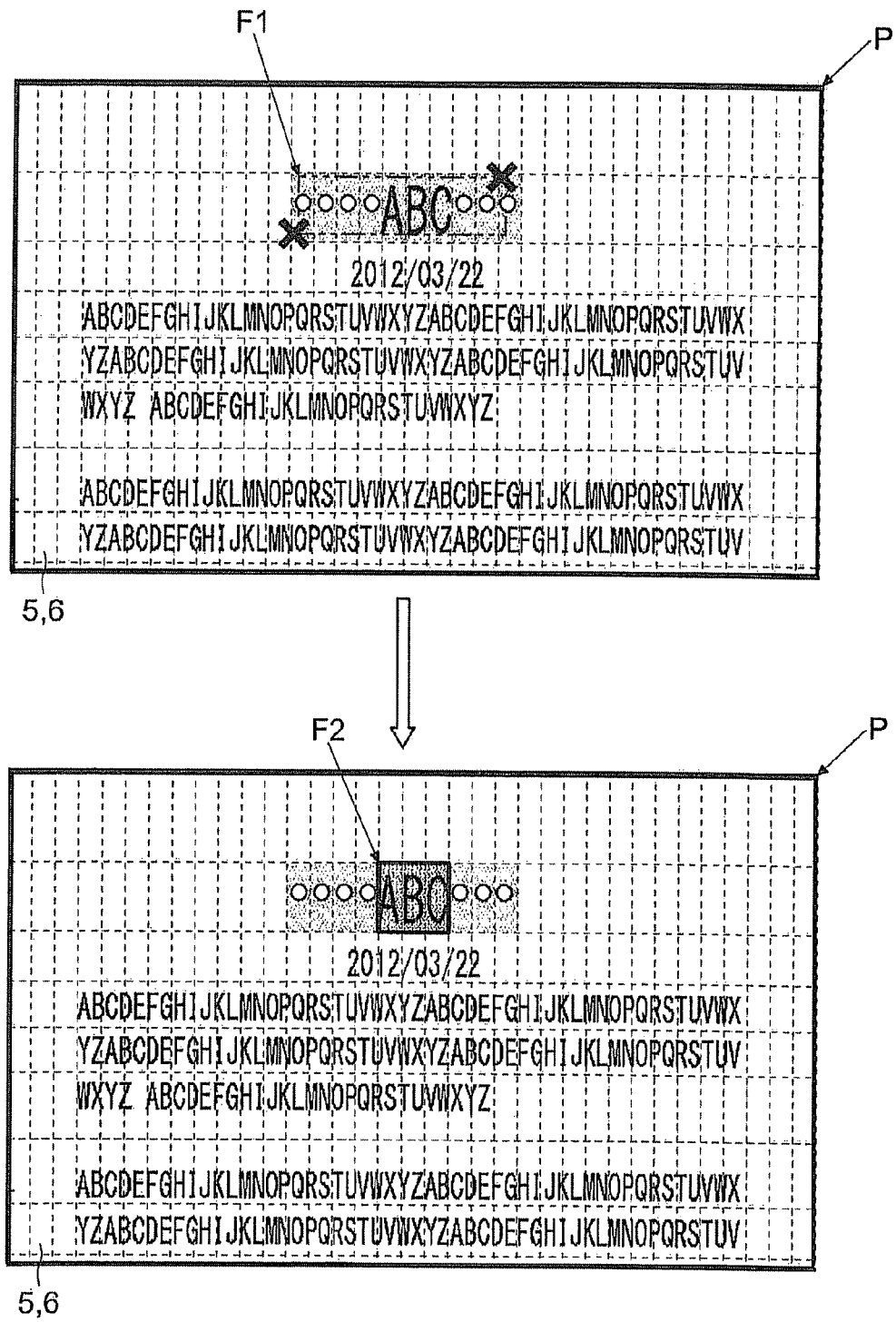
FIG. 13 is an explanatory diagram for explaining the automatic adjustment of the boundary of the specified region in the image processing apparatus according to the embodiment.
Figure 14:
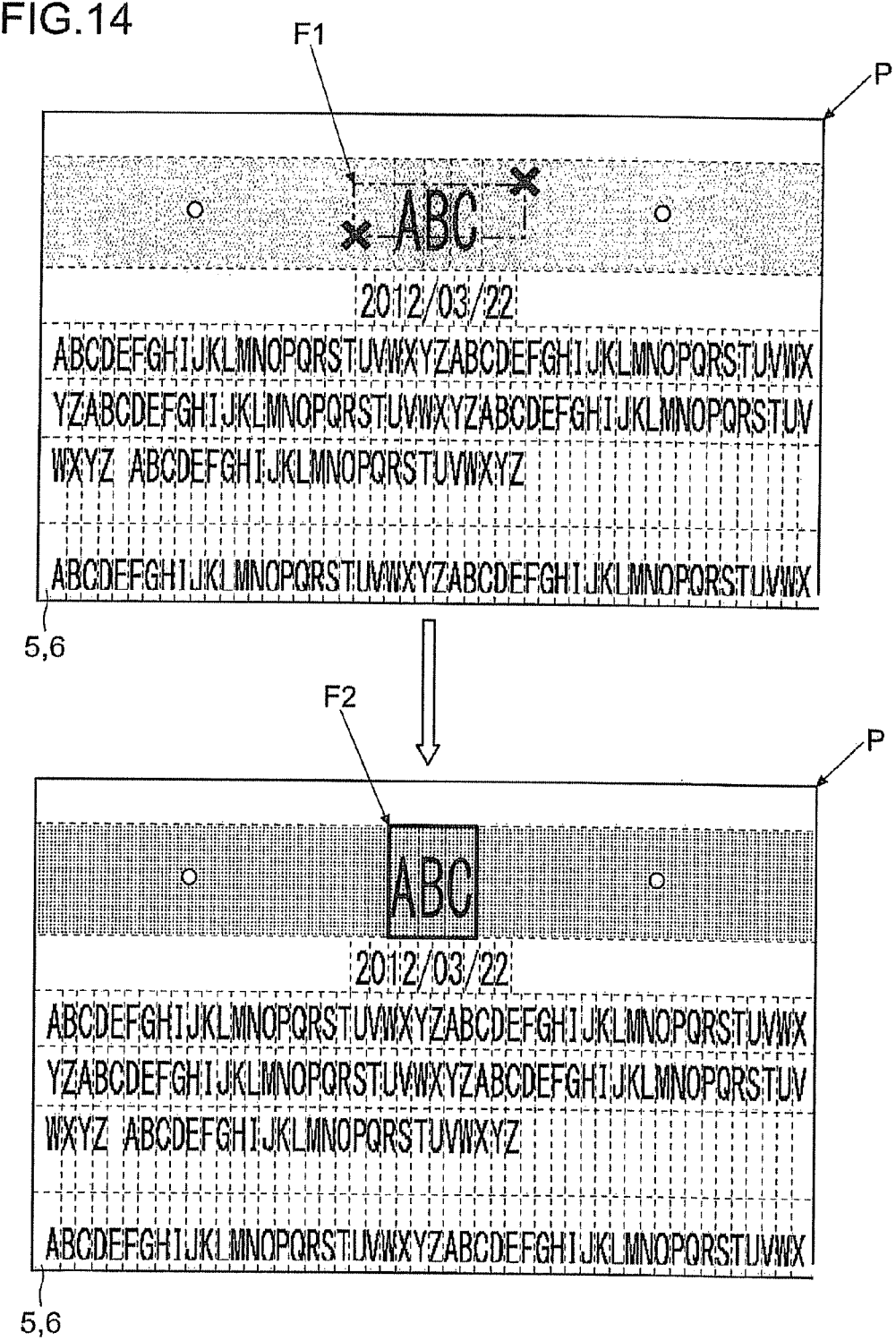
FIG. 14 is an explanatory diagram for explaining the automatic adjustment of the boundary of the specified region in the image processing apparatus according to the embodiment.

Next, with reference to FIGS. 12 to 14 and FIG. 7, automatic adjustment of the boundary of the specified region F2 is described. FIGS. 12 to 14 are explanatory diagrams for explaining automatic adjustment of the boundary of the specified region F2 in the operation panel 1 according to the embodiment.

FIG. 11 illustrates a case where all sections overlapping with the rectangular region F1 are regarded as the specified region F2. However, there is a case where a section having no information is included in the rectangular region F1. Such a section having no information may not be necessarily included in the specified region F2 and may be removed.

Therefore, the multifunctional peripheral 100 (image processing apparatus 10) of this embodiment has a function of automatically removing a section having no information among sections included in the rectangular region F1 (overlapping with the rectangular region F1) from the specified region F2. Thus, a boundary between a section having information such as an image or a character and a section having no information becomes the boundary of the specified region F2.

Whether or not to automatically remove a region having no information among sections included in the rectangular region F1 from the specified region F2 can be set in the region specification setting screen S2 concerning the region specification illustrated in FIG. 7. The method of retrieving the region specification setting screen S2 is as described above.

Further, by touching a display position of an execution key K4 (with characters of "yes" in FIG. 7) in the region specification setting screen S2, it is possible to set so that a region having no information is automatically removed from the specified region F2. In addition, by touching a display position of a non-execution key K5 (with characters of "no" in FIG. 7), it is possible to set so that all sections overlapping with the rectangular region F1 can be recognized as the specified region F2 (see FIG. 11). The selection by the execution key K4 and the selection by the non-execution key K5 are performed selectively, and one of the execution key K4 and the non-execution key K5 is touched in a default state.

Specifically, with reference to FIGS. 12 to 14, the process of removing a section having no information among sections overlapping with the rectangular region F1 is described.

First, FIG. 12 illustrates an enlarged view of a part of the preview image P divided into sections having a predetermined size. Then, in FIG. 12, the rectangular region F1 specified by two-point touching is illustrated by a double-dotted-dashed line, and sections overlapping with the rectangular region F1 is illustrated by half-tone dot meshing.

Further, if it is set to automatically remove a region having no information from the specified region F2, the panel controller 9 generates a histogram of density (color) distribution of pixels of the image data for displaying the preview image P. Then, pixels having a density in a constant range including density (color) having the largest frequency are recognized as pixels of the background color. For instance, the panel controller 9 recognizes pixels whose pixel value difference from a pixel value of a largest frequency is within a predetermined pixel value to be pixels of the background color.

Further, the panel controller 9 distinguishes (discriminates) whether each section is a first section having information or a second section having no information. The "first section" is a section having information in which a predetermined amount (a predetermined ratio) or more of characters, figures, symbols, a plurality of colors other than the background color such as white, or the like are included in the section. On the contrary, the "second section" is a section other than the first section, has basically only the background color pixels or a predetermined ratio or more of background color pixels, and has no information.

The panel controller 9 checks a pixel value of each pixel in each section in the image data of the preview image P. Then, the panel controller 9 determines with reference to a predetermined ratio (for example, approximately 80 to 100%). Specifically, the panel controller 9 determines a section in which a ratio of the number of pixels having the background color pixel value to a total number of pixels in the section is a predetermined value or larger to be the second section, and determines a section in which the ratio is smaller than the predetermined value to be the first section (including more pixels having a pixel value other than the background color).

Further, the panel controller 9 recognizes the second sections positioned outside of the one or group of (unit of) first sections among sections included in the rectangular region F1. Specifically, in a middle part and a lower part of FIG. 12, a white circle mark is assigned to the second section. Then, as illustrated in the lower part of FIG. 12 by a thick line, the panel controller 9 recognizes a boundary between the group of (unit of) first sections (that may include the second section) and the second section positioned outside of the group of (unit of) first sections to be the boundary of the specified region F2. Thus, without an operation of strictly specifying the range, the region in which a character or a symbol is written can be appropriately specified.

In addition, FIG. 13 illustrates a diagram in which the preview image P is divided into sections in such a manner that the vertical width of the section is varied in accordance with the space between lines while the horizontal width of the section is set to a predetermined size. Further, FIG. 13 illustrates the rectangular region F1 specified by two-point touching by a double-dotted-dashed line and illustrates the sections overlapping with the rectangular region F1 by half-tone dot meshing. In addition, in FIG. 13, the second section is assigned with a white circle mark.

Further, as illustrated in the lower part of FIG. 13 by a thick line, the panel controller 9 recognizes the boundary between the group of (unit of) the first sections and the second section outside the group of (unit of) first sections among the sections overlapping with the rectangular region F1 to be the boundary of the specified region F2.

Further, FIG. 14 illustrates a diagram in which the vertical width of the section is varied in accordance with the space between lines while the horizontal width of the section is varied in accordance with the space between characters, so as to divide the preview image P into sections. Further, in FIG. 14, the rectangular region F1 specified by two-point touching is illustrated by a double-dot-dashed line, and the sections overlapping with the rectangular region F1 are illustrated by half-tone dot meshing. In addition, in FIG. 14, the second section is assigned with a white circle mark.

Further, as illustrated in the lower part of FIG. 14 by a thick line, the panel controller 9 recognizes the boundary between the group of (unit of) first sections and the second section outside the group of first sections among the sections overlapping with the rectangular region F1 to be the boundary of the specified region F2.

In addition, the panel controller 9 controls the display portion 5 to display the boundary between the first section and the second section as the boundary of the specified region F2. In addition, the processing portion (panel controller 9) controls the display portion 5 to display the boundary between sections that is a peripheral edge of the specified region F2 as the range of the specified region F2 on the preview image P (for example, displays by a thick line). Thus, the user can recognize visually which range is specified as the specified region F2.

In this way, the processing portion (panel controller 9) discriminates between the first section having information and the second section having no information among the sections. Then, the processing portion recognizes the specified region F2 by the boundary between the one or group of first sections and the second section outside the first section among the sections overlapping with the rectangular region F1 to be the boundary of the specified region F2. Thus, the regions in which excess sections having no information are removed from the sections overlapping with the rectangular region F1 are automatically specified. In other words, by automatically deleting the unnecessary region to reduce the rectangular region F1, only the sections including a character or the like are recognized as the specified region F2. The region (range or object) desired by the user to be processed is a region having information such as a character, and the region can be specified to enclose the region having information only by touching two points so that the desired region is included. Therefore, when touching the touch panel with a finger to specify the region, a desired region can be easily and securely specified in short time.

(Transition Between Region Specification Mode Based on Sections and Region Specification Mode without Depending on Sections)

Figure 15A:
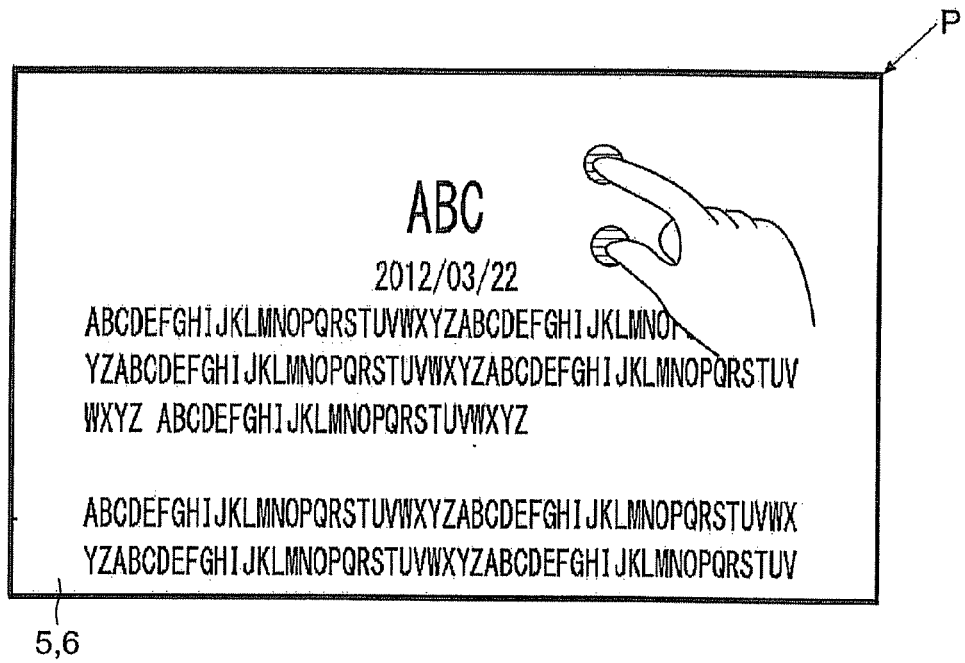
FIG. 15A, 15B is a diagram for explaining a transition method of a mode for specifying a region in the image processing apparatus according to the embodiment.
Figure 15B:
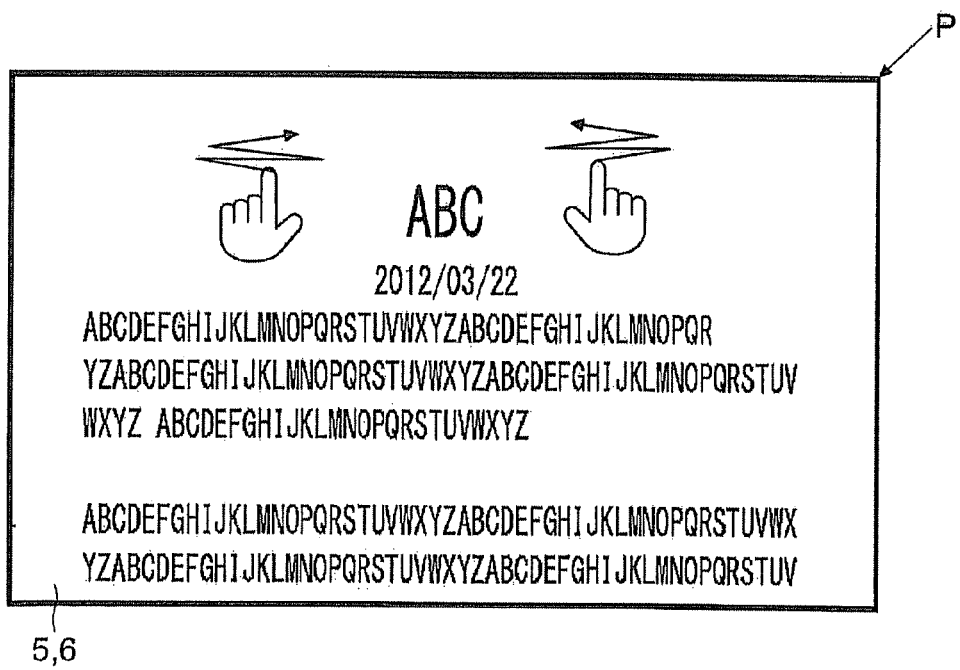
Figure 16:
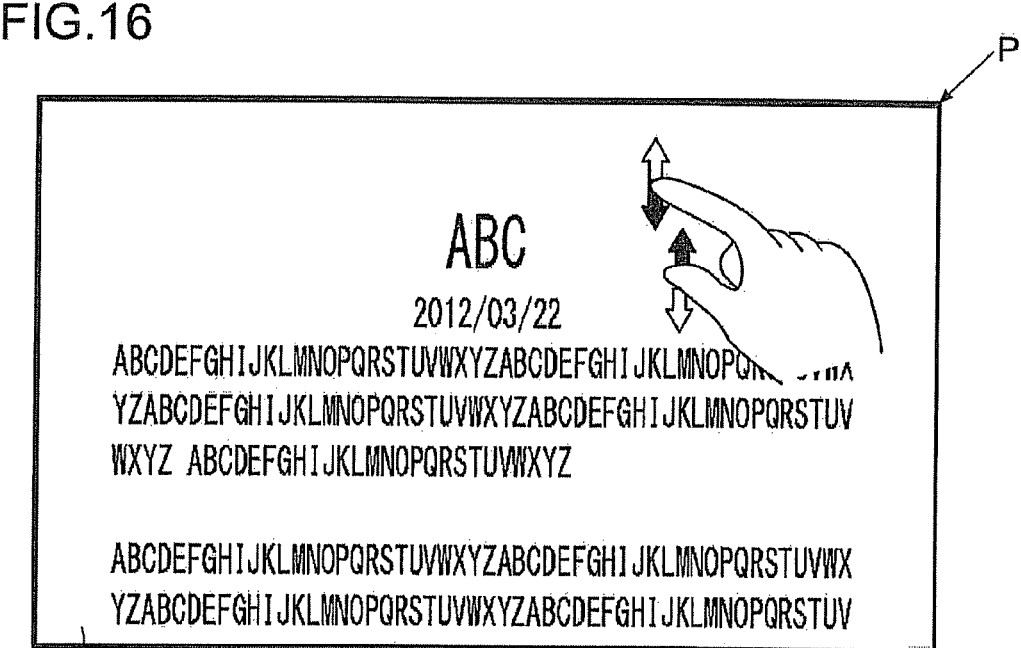
FIG. 16 is a diagram illustrating an example of operation for enlarging or reducing the preview image in the image processing apparatus according to the embodiment.
Figure 16:
Figure 16:
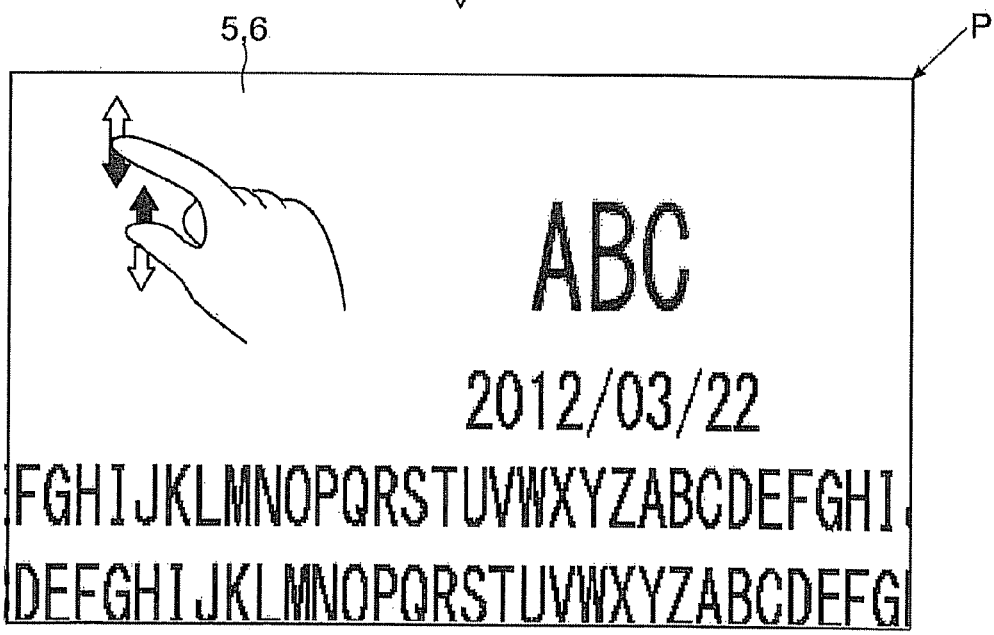

Next, with reference to FIGS. 15a, 15b and 16, transition between modes for specifying the region is described. FIG. 15A, 15B is a diagram illustrating an example of a method of transition between modes for specifying the region on the operation panel 1 according to the embodiment. FIG. 16 is a diagram illustrating an example of an operation of enlarging or reducing the preview image P on the operation panel 1 according to the embodiment.

In the multifunctional peripheral 100 (image processing apparatus 10) of this embodiment, it is possible to divide the preview image P displayed on the display portion 5 into sections and to specify the region with reference to the section. However, the user may desire to specify the region not by a section but by another prepared operation method.

Therefore, the multifunctional peripheral 100 (image processing apparatus 10) of this embodiment also has a region specification mode without depending on the section. For instance, in a region specification mode without depending on the section, it is possible to specify the region by a dragging operation to enclose the region on the touch panel portion 6. In addition, in another region specification mode without depending on the section, it is possible to specify the region by an operation of specifying a rectangular region by touching four points to be four corners of the rectangle.

It is possible to switch between the region specification mode based on the section and the region specification mode without depending on the section. When the panel controller 9 recognizes that a predetermined operation for switching the mode is performed on the touch panel portion 6 on the basis of an output of the touch panel portion 6, the panel controller 9 switches the method for recognizing the specified region F2.

In this way, there may be a case where the user wants to simply view the preview image P, or to specify coordinates by touching without using a section, or other case where the user does not intend to specify the region by a section. Therefore, after a predetermined operation is performed on a touch panel portion 6, the processing portion (panel controller 9) performs a process for recognizing the rectangular region F1 and the specified region F2 on the basis of two touched positions. Thus, unintended specification of the region based on a section is avoided.

For instance, as illustrated in FIG. 15A, the predetermined operation for switching the mode can be an operation of long pressing two points. In addition, as illustrated in FIG. 15B, the predetermined operation for switching the mode can be an operation of moving the two touched points simultaneously in the left and right direction (up and down direction) a plurality of times. Note that the predetermined operation for switching the mode may be other type of gesture operation without limiting to the above-mentioned operations.

Further, the region specification mode based on the section, the operation of moving the two touched points (operation of changing a distance between two points) is accepted as the operation of adjusting the shape of the rectangular region F1. On the other hand, in the region specification mode without depending on the section, the operation of moving the two touched points (operation of changing the distance between two points) is accepted as the operation of indicating enlargement or reduction of the preview image P.

In the region specification mode without depending on the section, as illustrated in FIG. 16, the touch panel portion 6 accepts the operation of increasing the distance between two points while touching the two points (operation of moving fingers in white arrow directions as illustrated in the upper part of FIG. 16) as the operation of enlarging the preview image P. When the panel controller 9 recognizes that the operation of instructing enlargement the preview image P, the panel controller 9 generates the image data for displaying the preview image P after the enlargement, and controls the display portion 5 to display the enlarged preview image P on the basis of the generated image data (see the lower part of FIG. 16).

In the region specification mode without depending on the section, as illustrated in FIG. 16, the touch panel portion 6 accepts the operation of decreasing the distance between the two touched points (operation of moving fingers in black arrow directions as illustrated in the upper part of FIG. 16) as the operation of instructing reduction of the preview image P. When the panel controller 9 recognizes that the operation of instructing reduction of the preview image P is performed, the panel controller 9 generates the image data for displaying the preview image P after the reduction, and controls the display portion 5 to display the reduced preview image P on the basis of the generated image data.

(Display of Boundary Between Sections)

Figure 17:
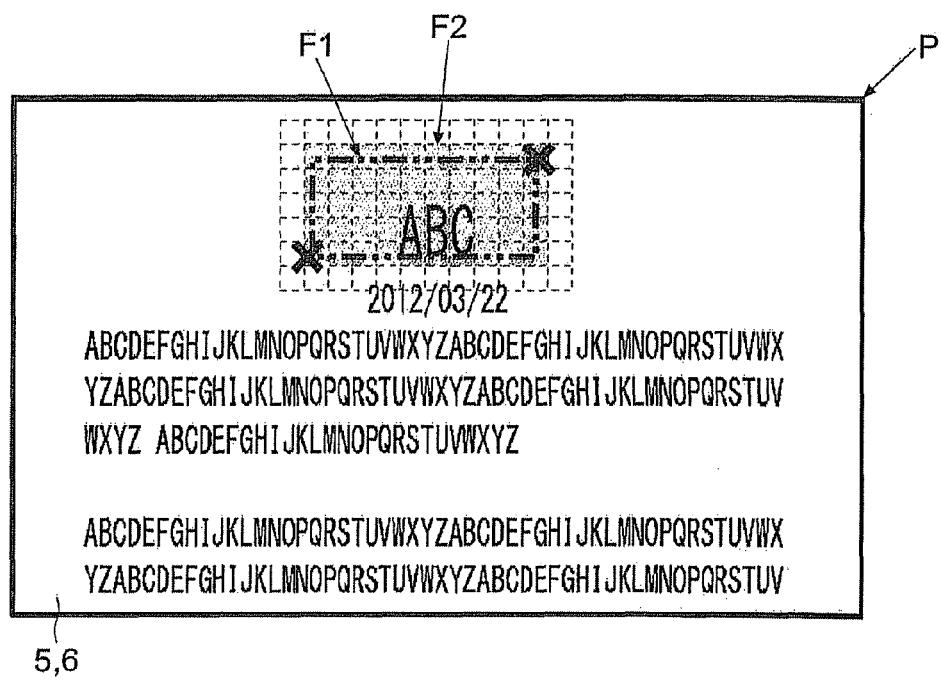
FIG. 17 is a diagram for explaining a display of only a boundary of a section in the image processing apparatus according to the embodiment.

Next, with reference to FIG. 17, the display of the boundary between sections is described. FIG. 17 is a diagram for explaining a display of only a part of the boundaries between sections.

In the example described above, all the boundaries between sections are displayed to be overlaid on the preview image P. However, when all the boundaries between sections are displayed, some users may feel that the preview image P cannot be easily viewed. Therefore, in the multifunctional peripheral 100 (image processing apparatus 10) of this embodiment, the user can select to display all the boundaries between sections or to display only a part of the boundaries between sections.

Whether only a part of the boundaries between sections is displayed or all the boundaries between sections are display to be overlaid on the preview image P can be set in the region specification setting screen S2 concerning the region specification illustrated in FIG. 7. The method of retrieving the region specification setting screen S2 is as described above.

By touching a display position of a whole key K6 in the region specification setting screen S2, it is possible to set to display all the boundaries between sections to be overlaid on the preview image P. In addition, by touching a display position of a part key K7, it is possible to set to display only a part of the boundaries between sections to be overlaid on the preview image P (see FIG. 17).

In the case where it is selected to display only a part of the boundaries between sections to be overlaid on the preview image P, the panel controller 9 controls the display portion 5 to display at least the boundary between sections overlapping with the rectangular region F1 as illustrated in FIG. 17. Note that in the case where it is selected to display only a part of the boundaries between sections is displayed to be overlaid on the preview image P, the panel controller 9 may control the display portion 5 to display the boundary between sections adjacent to the section overlapping with the rectangular region F1. FIG. 17 illustrates the example where the panel controller 9 controls the display portion 5 to display the boundary between sections adjacent to the section overlapping with the rectangular region F1, too.

In this case, the processing portion (panel controller 9) controls the display portion 5 to display at least the boundary between sections in the rectangular region F1 to be overlaid on the preview image P. Thus, all the boundaries between sections included in the entire preview image P are not displayed, but only the boundary of the section concerning the region to be specified is displayed. Therefore, it is not difficult to view the preview image P due to the display of the sections.

In this way, the processing portion (panel controller 9) controls the display portion 5 to display the sections and a part of the boundaries between sections or all the boundaries to be overlaid on the preview image P. Thus, the user can recognize visually how the sections are disposed. In other words, the user can recognize visually how the region of the preview image P is divided.

(Region Specification and Process Flow on Preview Image P)

Figure 18:
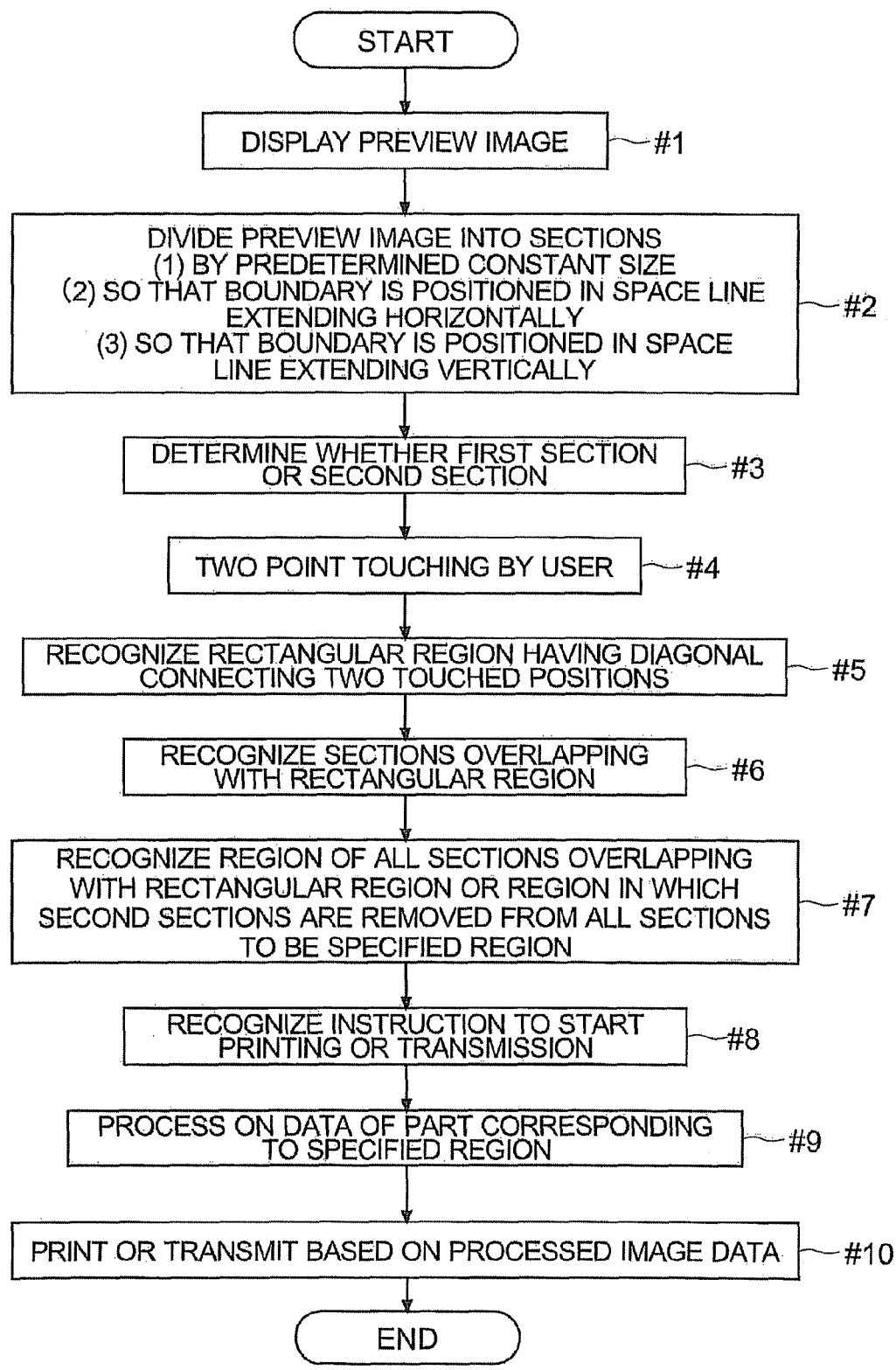
FIG. 18 is a flowchart illustrating an example of a flow of the region specification on the preview image and processing based on the specified region in the image processing apparatus according to the embodiment.

Next, with reference to FIG. 18, the region specification on the preview image P and a process flow based on the specified region in the region specification mode based on the section are described. FIG. 18 is a flowchart illustrating the region specification on the preview image P and the process flow based on the specified region in the region specification mode based on the section of the image processing apparatus 10 according to the embodiment.

First, the flow of FIG. 18 starts when the display of the preview image P is started before starting the printing or the transmission. As described above, it is possible to select which process is performed before or after displaying the preview image P.

First, the panel controller 9 controls the display portion 5 to display the preview image P on the basis of the image data for displaying the preview image P generated from the image data to be used by the job (Step #1). The image data to be used by the job is image data stored in the storage device 72 or image data generated by the image reader 2a reading a document. Then, the image processing portion 8 generates the image data for displaying the preview image P by thinning out pixels from the image data to be used by the job. Alternatively, the panel controller 9 may receive the image data to be used by the job from the storage device 72, so as to generate the image data for displaying the preview image P.

Note that if the image data to be used by the job has a plurality of pages, the image data for displaying the preview image P is generated for each page. Then, when the panel controller 9 recognizes that a specific operation for switching the page (for example, a page switching operation of moving one touched position to slide on the touch panel portion 6) is performed, the panel controller 9 switches the page of the preview image P to be displayed. Note that the switching of the display to the previous or next page is performed in accordance with the moving direction of the touched position in the page switching operation. For instance, switching to the next page is performed when an operation of flicking from the right to the left is performed, and switching to the previous page is performed when an operation of flicking from the right to the left is performed.

Then, the panel controller 9 divides the preview image P into sections and controls the display portion 5 to display the divided sections (Step #2). There are three methods of dividing into sections as described above, including (1) dividing into sections having a predetermined constant size, (2) dividing so that the boundary is positioned in the space line that extends horizontally and has a predetermined width or larger width, and (3) dividing so that the boundary is positioned in the space line that extends vertically and has a predetermined width or larger width. By one of these three methods (1) to (3), the panel controller 9 divides the preview image P into sections. In addition, the panel controller 9 determines whether each of the sections is the first section or the second section (Step #3).

Further, the touch panel portion 6 receives the user's two-point touching (Step #4). Then, the panel controller 9 recognizes the rectangular region F1 having a diagonal connecting two touched positions on the basis of the output of the touch panel portion 6 (Step #5). Then, the panel controller 9 recognizes the sections overlapping with the rectangular region F1 (Step #6).

The panel controller 9 recognizes the region of all the sections overlapping with the rectangular region F1, or the region of the sections overlapping with the rectangular region F1 except for the second sections to be the specified region F2 (Step #7). Note that a plurality of the regions may be specified in one page. If the preview image P has a plurality of pages, the region can be specified in each page. In other words, a plurality of the specified regions F2 can be set.

Further, when the region specification is completed, the panel controller 9 recognizes the instruction for starting printing or transmission such as the operation of pressing the start key 12 on the operation panel 1 or an operation of instructing to start printing or transmission to the touch panel portion 6 (Step #8).

Next, the image processing portion 8 performs the selected process on the data of the part corresponding to the specified region F2 in the image data to be used by the job (Step #9). The panel controller 9 or the image processing portion 8 determines coordinates of the region corresponding to the specified region F2 in the image data to be used by the job from coordinates of the specified region F2 on the preview image P. Alternatively, it is possible to adopt a structure in which a table data indicating a relationship of coordinates between the image data to be used by the job and the image data for displaying the preview image P is stored in the memory 14 or the storage device 72, and the panel controller 9 or the image processing portion 8 determines the coordinates of the region of the data of the part corresponding to the specified region F2 in the image data to be used by the job by referring to the table data.

In this way, the image processing apparatus 10 (multifunctional peripheral 100) according to this embodiment includes the storage portion for storing the image data (the memory 14 or the storage device 72), the image processing portion 8 for performing the image processing on the image data, the display portion 5 for displaying the preview image P indicating the image data content on the basis of the image data, the touch panel portion 6 disposed with respect to the display portion 5 for detecting the touched position as a position touched by the user, and the processing portion (panel controller 9) which recognizes the touched position on the basis of the output of the touch panel portion 6, recognizes the rectangular region F1 having a diagonal connecting two touched positions, recognizes the specified region F2 on the basis of the sections overlapping with the rectangular region F1 among the plurality of sections obtained by dividing the preview image P displayed on the display portion 5, and controls the image processing portion 8 to perform the process on the data of the part corresponding to the specified region F2 in the image data.

Thus, a size of the specified region F2 varies by a width of the section. Therefore, compared with a case where the range of the specified region F2 is handled by one display pixel of the display portion 5, a deviation of the touched position to some extent can be absorbed by the width (length of the side) of the section. Therefore, even if the touched position is deviated from an ideal touched position to some extent, the specified region F2 becomes the same region as in a case where the touched position has no deviation from the ideal touched position. Further, it is possible to easily specify the region to be the desired region. In addition, it is possible to specify (select) the region on the basis of the rectangular region F1 defined by the two touched positions. Therefore, it is possible to easily specify the desired range in short time without repeating the touching for specifying the region, dragging operation for specifying the region, or inputting coordinate values for specifying the region. In other words, the region can be specified only by two-point touching so that the desired region is included (so as to sandwich the (desired region) in the part displayed as the preview image P.

In addition, the image forming apparatus (multifunctional peripheral 100) includes the image processing apparatus 10 according to the embodiment, and a printer for printing on the basis of the processed image data. Thus, because the easy-to-use image processing apparatus 10 is included, in which specification of the desired region can be easily and securely performed in short time, it is possible to provide the image forming apparatus that enables to easily produce a printed matter on the basis of the image data on which the process (image processing) is performed in the desired region.

Next, the main controller 7 controls the printer (the paper sheet feeder 3a, the transporting portion 3b, the image forming portion 4, the intermediate transfer portion 5a, the fixing portion 5b, the discharge transport portion 3c, and the double-side transporting portion 3d) to perform printing on the basis of the processed image data, or controls the communication portion 73 to perform transmission of the processed image data (Step #10). Then, when the job is finished, this flow is finished (END).

Although the embodiment of the present disclosure is described above, the scope of the present disclosure is not limited to the embodiment and can be modified variously within the scope of the disclosure without deviating from the spirit thereof.

What is claimed is:

1. An image processing apparatus comprising:
    a storage portion for storing image data;
    an image processing portion for performing image processing on image data;
    a display portion for displaying a preview image indicating content of the image data on the basis of the image data;
    a touch panel portion disposed with respect to the display portion so as to detect a touched position which is a position touched by a user; and
    a processing portion which recognizes the touched position on the basis of an output of the touch panel portion, recognizes a rectangular region having a diagonal connecting two touched positions, recognizes a specified region on the basis of a section overlapping with the rectangular region among a plurality of sections obtained by dividing the preview image displayed on the display portion, and controls the image processing portion to perform processing of data of a part of the image data corresponding to the specified region.

2. The image processing apparatus according to claim 1, wherein the processing portion discriminates between a first section having information and a second section having no information among the sections, and recognizes the specified region by recognizing a boundary between the one or group of first sections and the second section outside the first sections among sections overlapping with the rectangular region to be a boundary of the specified region.

3. The image processing apparatus according to claim 1, wherein the processing portion divides the preview image displayed on the display portion into a plurality of sections having a predetermined size in a lattice manner.

4. The image processing apparatus according to claim 1, wherein the processing portion recognizes a space line having a predetermined width or larger width on the basis of a width of a background color part in the preview image, and divides the preview image into a plurality of sections so that the boundary between sections is positioned in at least one of a space line extending horizontally and a space line extending vertically.

5. The image processing apparatus according to claim 4, wherein
    the touch panel portion accepts in advance a selection whether to divide the preview image displayed on the display portion into the plurality of sections having a predetermined size in a lattice manner or to divide the preview image into the plurality of sections so that the boundary between sections is positioned in at least one of the space line extending horizontally and the space line extending vertically, and
    the processing portion divides the preview image into the plurality of sections in accordance with the accepted selection.

6. The image processing apparatus according to claim 1, wherein the processing portion controls the display portion to display the boundary between sections that is a peripheral edge of the specified region as a range of the specified region on the preview image.

7. The image processing apparatus according to claim 1, wherein the processing portion controls the display portion to display the sections and a part or a whole of the boundaries between sections to be overlaid on the preview image.

8. The image processing apparatus according to claim 1, wherein the processing portion controls the display portion to display at least the boundaries between sections within the rectangular region to be overlaid on the preview image.

9. The image processing apparatus according to claim 1, wherein
    the touch panel portion accepts an input of selecting the process to be performed,
    the process is one of a color conversion process, a masking process, and a trimming process, and
    the processing portion controls the image processing portion to perform the selected process on data of a part of the image data corresponding to the specified region.

10. The image processing apparatus according to claim 1, wherein after a predetermined operation is performed to the touch panel portion, the processing portion performs a process of recognizing the rectangular region and the specified region on the basis of the two touched positions.

11. An image forming apparatus comprising:
    the image processing apparatus according to claim 1; and
    a printer for performing printing based on the processed image data.

12. A method for controlling an image processing apparatus, the method comprising the steps of:
    storing image data;
    performing image processing on image data;
    displaying a preview image indicating content of the image data on the basis of the image data;
    detecting a touched position which is a position touched by a user on a display portion for displaying the preview image;
    recognizing the touched position so as to recognize a rectangular region having a diagonal connecting two touched positions;
    recognizing a specified region on the basis of a section overlapping with the rectangular region among a plurality of sections obtained by dividing the displayed preview image; and
    performing processing of data of a part of the image data corresponding to the specified region.

13. The method for controlling an image processing apparatus according to claim 12, further comprising the steps of:
    discriminating between a first section having information and a second section having no information; and
    recognizing the specified region by recognizing a boundary between the one or group of first sections and the second section outside the first sections among sections overlapping with the rectangular region to be a boundary of the specified region.

14. The method for controlling an image processing apparatus according to claim 12, further comprising the step of dividing the preview image displayed on the display portion into the plurality of sections having a predetermined size in a lattice manner.

15. The method for controlling an image processing apparatus according to claim 12, further comprising the steps of:
    recognizing a space line having a predetermined width or larger width on the basis of a width of a background color part in the preview image; and
    dividing the preview image into the plurality of sections so that the boundary between sections is positioned in at least one of the space line extending horizontally and the space line extending vertically.

16. The method for controlling an image processing apparatus according to claim 12, further comprising the step of displaying the boundary between sections that is a peripheral edge of the specified region as a range of the specified region on the preview image.

17. The method for controlling an image processing apparatus according to claim 12, further comprising the step of displaying the sections and a part or a whole of the boundaries between sections to be overlaid on the preview image.

18. The method for controlling an image processing apparatus according to claim 12, further comprising the step of displaying at least the boundaries between sections within the rectangular region to be overlaid on the preview image.

19. The method for controlling an image processing apparatus according to claim 12, further comprising the steps of:
   accepting an input of selecting the process to be performed, which is one of a color conversion process, a masking process, and a trimming process; and
   performing the selected process on data of a part of the image data corresponding to the specified region.

20. The method for controlling an image processing apparatus according to claim 12, further comprising the step of performing the process of recognizing the rectangular region and the specified region on the basis of the two touched positions after the predetermined operation is performed.

* * * * *